United States Patent
Nam et al.

(10) Patent No.: US 9,805,291 B2
(45) Date of Patent: Oct. 31, 2017

(54) METHOD AND APPARATUS FOR STEREOSCOPICALLY RENDERING THREE-DIMENSIONAL CONTENT BY INCLUDING A LEFT IMAGE AND A RIGHT IMAGE

(71) Applicant: Samsung Electronics Co., Ltd., Gyeonggi-do (KR)

(72) Inventors: Jung Nam, Gyeonggi-do (KR); Jungeun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 72 days.

(21) Appl. No.: 14/882,048

(22) Filed: Oct. 13, 2015

(65) Prior Publication Data
US 2016/0105669 A1   Apr. 14, 2016

(30) Foreign Application Priority Data
Oct. 13, 2014 (KR) .................. 10-2014-0137596

(51) Int. Cl.
*H04N 13/04* (2006.01)
*G06K 9/62* (2006.01)
*H04N 13/00* (2006.01)
*H04N 13/02* (2006.01)

(52) U.S. Cl.
CPC ....... *G06K 9/6267* (2013.01); *H04N 13/0022* (2013.01); *H04N 13/0275* (2013.01); *H04N 13/0296* (2013.01)

(58) Field of Classification Search
None
See application file for complete search history.

(56) References Cited

U.S. PATENT DOCUMENTS

| | | | |
|---|---|---|---|
| 7,746,346 B2 | 6/2010 | Woo | |
| 8,643,701 B2* | 2/2014 | Nguyen | H04N 13/025 348/47 |
| 2009/0116732 A1* | 5/2009 | Zhou | H04N 13/0029 382/154 |
| 2010/0165081 A1* | 7/2010 | Jung | H04N 13/0022 348/46 |
| 2011/0074925 A1* | 3/2011 | Turner | G06T 13/20 348/46 |

(Continued)

FOREIGN PATENT DOCUMENTS

KR   100682456   2/2007

*Primary Examiner* — Edward Martello
(74) *Attorney, Agent, or Firm* — The Farrell Law Firm, P.C.

(57) ABSTRACT

A method and apparatus for rendering content are provided. The content rendering method includes determining at least one reference plane set to three dimensional (3D) content, in response to a request for displaying 3D content; classifying objects, displayed on the 3D content, based on a location of each object relative to a location of the reference plane into objects corresponding to at least one of a first left image or a first right image, and objects corresponding to at least one common image, respectively; creating the first left image, the first right image and the at least one common image, according to the respective classified objects; and combining the at least one common image with each of the first left image and the first right image to form a second left image and a second right image, respectively.

20 Claims, 25 Drawing Sheets

(56) References Cited

U.S. PATENT DOCUMENTS

2012/0176371 A1\* 7/2012 Morifuji ............ G02B 27/2214
 345/419
2013/0009949 A1\* 1/2013 Hewes ............... H04N 13/0029
 345/419

\* cited by examiner

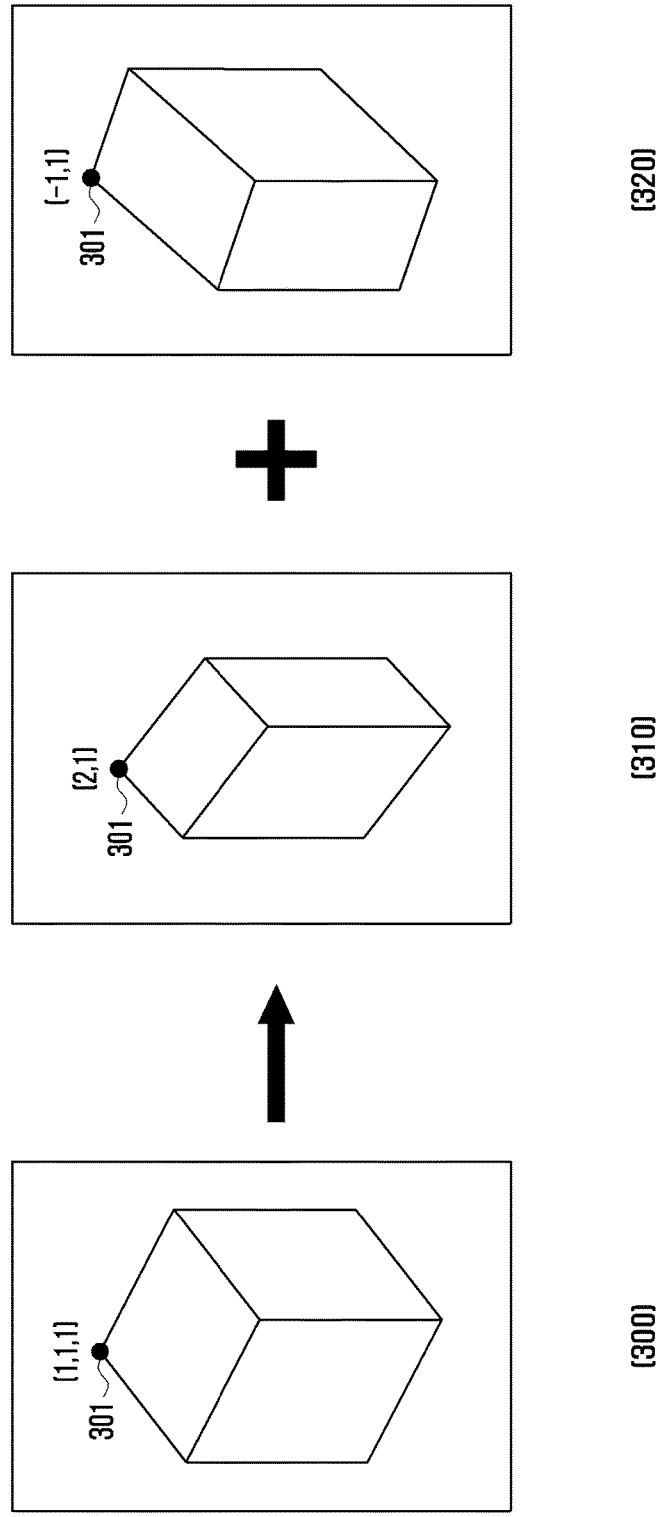

FIG. 7D
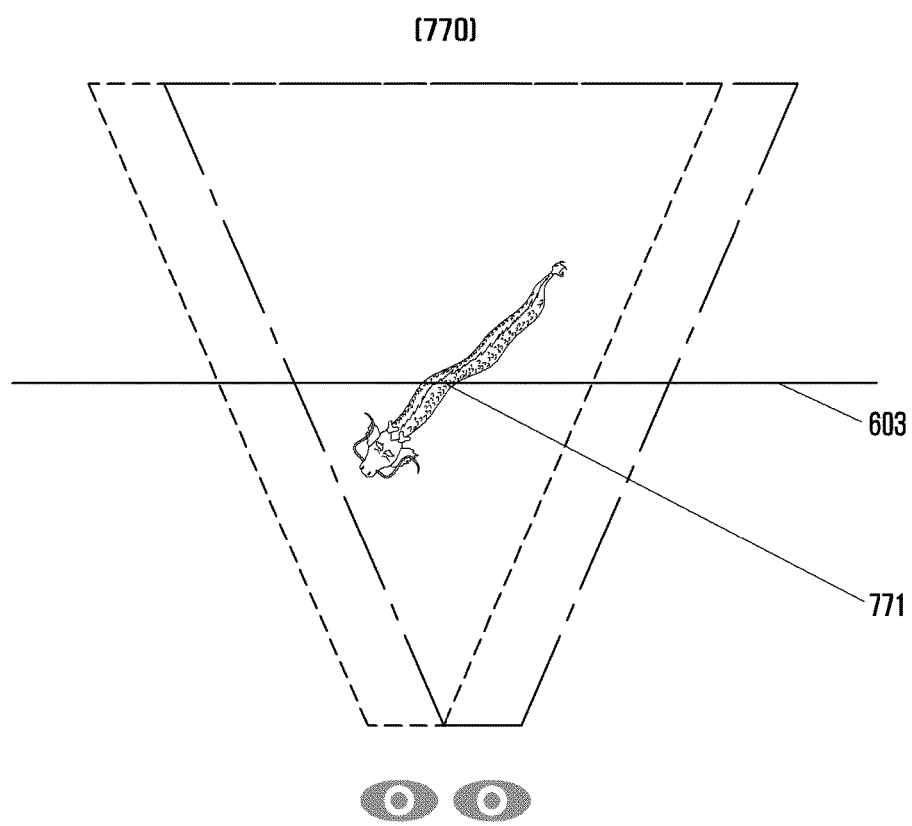
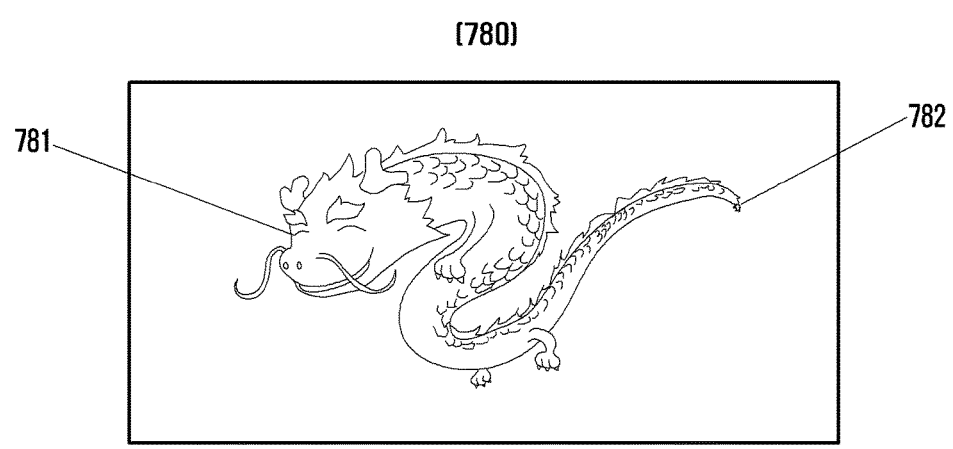

FIG. 10B
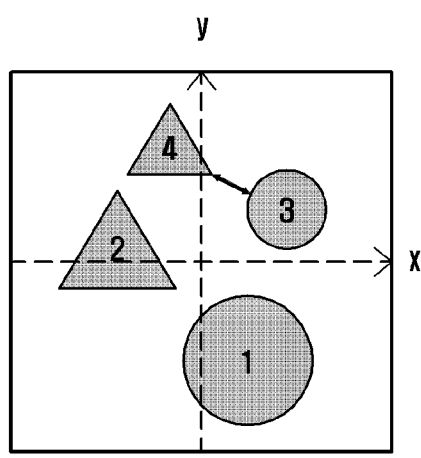
(1005)
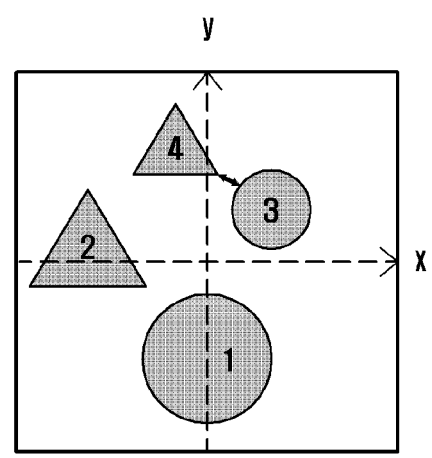
(1007)

FIG. 10C
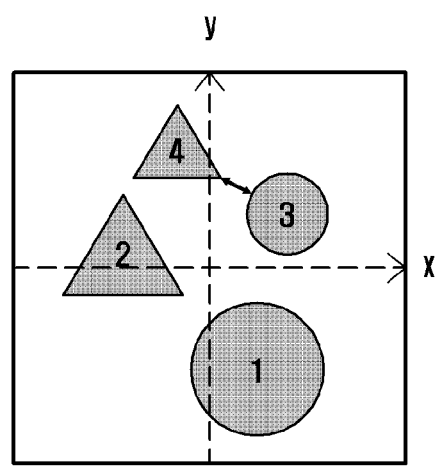
(1015)
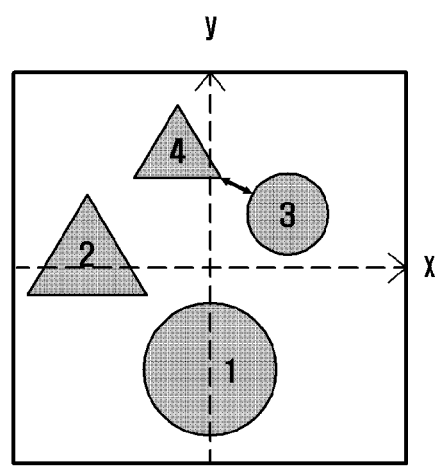
(1017)

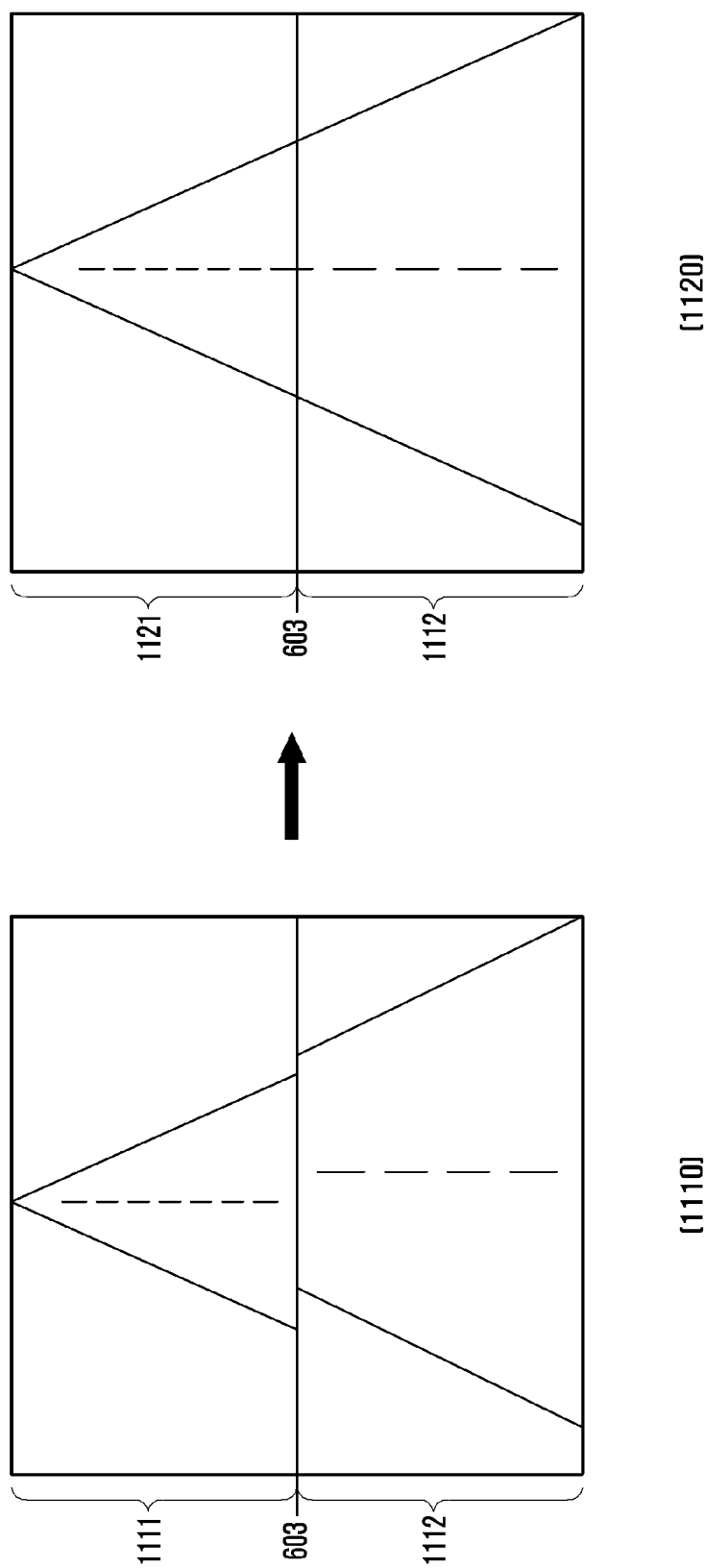

FIG. 13
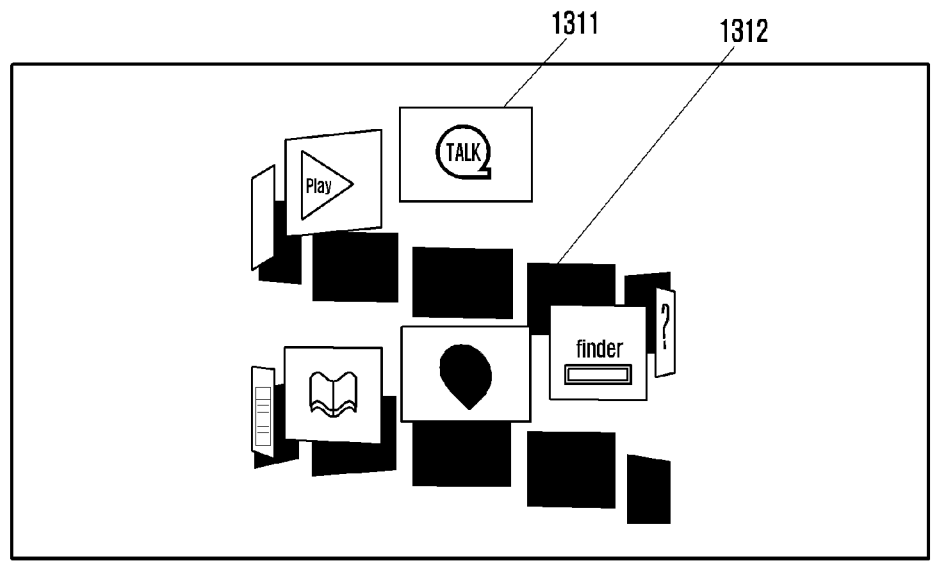
(1310)
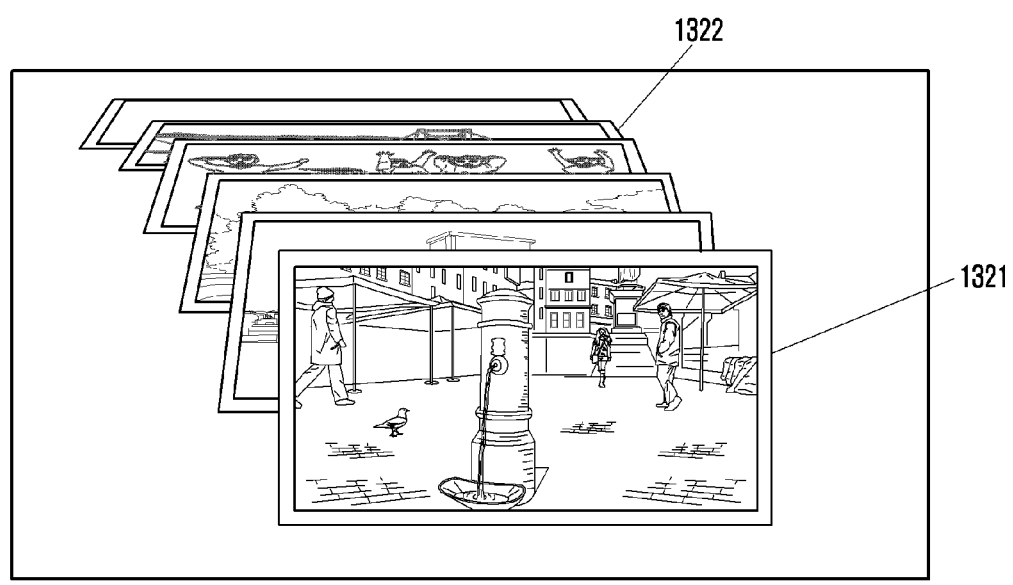
(1320)

METHOD AND APPARATUS FOR STEREOSCOPICALLY RENDERING THREE-DIMENSIONAL CONTENT BY INCLUDING A LEFT IMAGE AND A RIGHT IMAGE

PRIORITY

This application claims priority under 35 U.S.C. §119(a) to Korean Patent Application Serial No. 10-2014-0137596, which was filed in the Korean Intellectual Property Office on Oct. 13, 2014, the entire disclosure of which is incorporated herein by reference.

BACKGROUND OF THE INVENTION

1. Field of the Invention

The present invention relates generally to a method and apparatus for rendering content, and more particularly, to a method and apparatus for efficiently rendering three-dimensional content including a left image and a right image.

2. Description of the Related Art

Recently developed electronic devices may include displays that are able stereoscopically show images on a screen by using content produced in three-dimensions (3D). Methods of displaying screen images in 3D may use the principle that the right and left eyes of a user see the same image from slightly different angles. More specifically, 3D screen images are produced in such a way that a two-dimensional (2D) image viewed by the right eye and a 2D image viewed by the left eye sees are formed differently in consideration of the slightly different angles resulting from the distance between two eyes. The 2D images viewed by each eye are combined into one 3D image in the brain so that the user can perceive the combined image scenographically and stereoscopically.

In order to display 3D screen images by rendering 3D content produced with 3D coordinates, the 3D content must be rendered into the two stereoscopic images for the right and left eyes, respectively, with 2D coordinates.

When displaying 3D content such as 3D graphic games, etc., an electronic device may generally render 3D images in real-time. In a real-time rendering method, as the number of objects to be displayed on the screen increases, amount of wasted resources also increases, and the rendering speed decreases. As the rendering speed decreases, the display speed of 3D screen images may also decrease.

SUMMARY OF THE INVENTION

The present invention has been made to address at least the problems and/or disadvantages described above and to provide at least the advantages described below.

When performing a rendering operation to display 3D screen images, an aspect of the present invention provides a method to reduce the waste of rendering resources while increasing the rendering speed.

In accordance with an aspect of the present invention, a method of rendering content is provided. The method includes determining at least one reference plane set to three dimensional (3D) content, in response to a request for displaying 3D content; classifying objects, displayed on the 3D content, based on a location of each object relative to a location of the reference plane into objects corresponding to at least one of a first left image or a first right image, and objects corresponding to at least one common image, respectively; creating the first left image, the first right image and the at least one common image, according to the respective classified objects; and combining the at least one common image with each of the first left image and the first right image to form a second left image and a second right image, respectively.

In accordance with another aspect of the present invention, an electronic device for rendering content is provided. The electronic device includes a memory configured to store 3D content and operation programs; a processor configured to determine at least one reference plane set to three dimensional (3D) content, in response to receiving a request for displaying 3D content; classify objects, displayed on the 3D content, based on a location of each object relative to a location of the reference plane into objects corresponding to at least one of a first left image or a first right image, and objects corresponding to at least one common image, respectively; create the first left image, the first right image and the at least one common image, according to the respective classified objects; and combine at least one common image with each of the first left image and the first right image to form a second left image and a second right image, respectively; and a display for displaying the second left image and the second right image.

BRIEF DESCRIPTION OF THE DRAWINGS

The above and other aspects, features and advantages of certain embodiments of the present invention will become more apparent from the following detailed description taken in conjunction with the accompanying drawings, in which:

FIG. 3 is a series of diagrams illustrating a concept of a 3D rendering operation according to an embodiment of the present invention;

FIGS. 7A to 7D are diagrams illustrating the alteration in location of objects when performing a rendering operation according to an embodiment of the present invention;

FIGS. 10A to 10E are diagrams illustrating possible errors that may occur when performing a rendering operation according to an embodiment of the present invention;

FIGS. 11A and 11B are diagrams illustrating a method of removing possible errors that may occur when performing a rendering operation according to an embodiment of the present invention;

FIG. 13 is a diagram illustrating a method of implementing 3D on a menu screen according to various embodiments of the present invention.

DETAILED DESCRIPTION OF EMBODIMENTS

Figure 1:
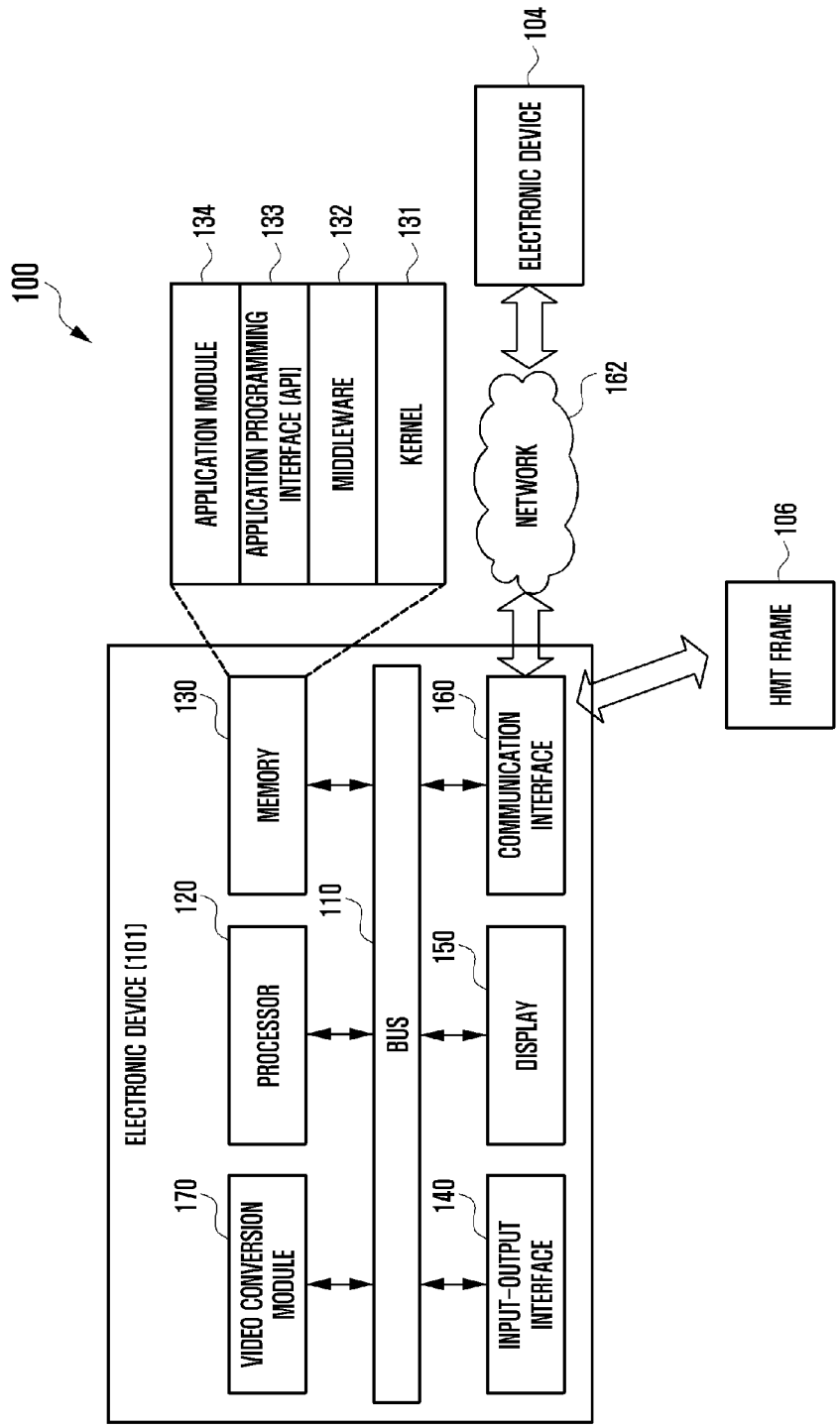
FIG. 1 is a diagram illustrating a network environment including an electronic device according to various embodiments of the present invention.

Hereinafter, various embodiments of the present invention will be described in detail with reference to the accompanying drawings. The present invention may have various embodiments, and modifications and changes may be made therein. Therefore, the various embodiments of the present invention will be described in detail with reference to particular embodiments shown in the accompanying drawings. However, there is no intent to limit the various embodiments of the present invention to the particular forms, and the present invention should be construed to cover all modifications, equivalents, and/or alternatives falling within the spirit and scope of the present invention. In the drawings, the same or similar elements may be designated by the same or similar reference numerals.

As used herein with reference to various embodiments of the present invention, the expressions "include" and "may include" refer to the existence of a corresponding function, operation, or constituent element, and does not limit one or more additional functions, operations, or constituent elements. Further, as used herein with reference to various embodiments of the present invention, terms such as "include" and "have" may be construed to denote a certain characteristic, number, step, operation, constituent element, component or a combination thereof, but do not preclude the existence of or a possibility of adding one or more other characteristics, numbers, steps, operations, constituent elements, components or combinations thereof.

As used herein with reference to various embodiments of the present invention, the expression "or" includes any or all combinations of words enumerated together. For example, the expression "A or B" may include A, may include B, or may include both A and B.

While expressions including ordinal numbers, such as "first" and "second", as used herein with reference to various embodiments of the present invention, may modify various constituent elements, such constituent elements are not limited by the above expressions (i.e., "first" and "second"). For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be referred to as a second constituent element, and likewise a second constituent element may also be referred to as a first constituent element without departing from the scope of the present invention.

When a component is referred to as being "connected to" or "accessed by" any other component, the component may be directly connected to or accessed by the other component, but another new component may also be interposed between them. By contrast, when a component is referred to as being "directly connected" or "directly accessed" to another component, there is no new component between the component and the other component.

Terms as in various embodiments of the present invention are merely for the purpose of describing particular embodiments and are not intended to limit the present invention. Singular forms are intended to include plural forms unless the context clearly indicates otherwise.

Unless defined otherwise, all terms used herein, including technical terms and scientific terms, have the same definition as commonly understood by a person of ordinary skill in the art to which the present invention pertains. Such terms as those defined in a generally used dictionary are to be interpreted to have definitions equivalent to the contextual meanings in the relevant field of art, and are not to be interpreted to have ideal or excessively formal meanings unless clearly defined in the present invention.

An electronic device according to the various embodiments of the present invention includes a rendering function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smartwatch).

According to some embodiments of the present invention, the electronic device may be a smart home appliance with a rendering function. The smart home appliance, for example, may include a television, a digital video disk (DVD) player, an audio, a refrigerator, an air conditioner, a vacuum cleaner, an oven, a microwave oven, a washing machine, an air cleaner, a set-top box, a TV box (e.g., SAMSUNG HOMESYNC™, APPLE TV™, GOGGLE TV™), a game console, an electronic dictionary, an electronic key, a camcorder, and an electronic photo frame.

According to some embodiments of the present invention, the electronic devices may include various medical devices (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) device in a shop.

According to some embodiments of the present invention, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to an embodiment of the present invention may be a combination of one or more of the aforementioned various devices. Further, the electronic device according to an embodiment of the present invention may be a flexible device. Further, it will be apparent to those skilled in the art that the electronic device according to an embodiment of the present invention is not limited to the aforementioned devices.

Hereinafter, an electronic device according to various embodiments of the present invention is described with reference to the accompanying drawings. The term "a user" as used herein may refer to any person who uses an electronic device or any other device (e.g., an artificial intelligence electronic device) using an electronic device.

In the following description, considering the characteristics of 3D data, an image that the right eye sees is called a 'right image' and an image that the left eye sees is called a 'left image.' This is because the right and left eyes see the same image from slightly different angles. The term 'image(s)' may be used with reference to video(s).

In the following description, 'rendering' refers to a process/operation of creating an image from data produced in 3D to display the image on the display screen. According to an embodiment of the present invention, 'rendering' is a process/operation of producing two types of images with 2D coordinates from a particular object with 3D coordinates, wherein the image may be produced as left and right images, respectively.

FIG. 1 is a network environment 100 including an electronic device 101 according to various embodiments of the present invention. Referring to FIG. 1, the electronic device 101 includes bus 110, processor 120, memory 130, input-output interface 140, display 150, communication interface 160, and video conversion module 170.

The bus 110 is a circuit that interconnects the above-described elements and delivers a communication (e.g., a control message) between the above-described elements.

The processor 120 receives commands from the above-described other elements (e.g., the memory 130, the input-output interface 140, the display 150, the communication interface 160, and the video conversion module 170, etc.) through the bus 110, may interpret the received commands, and may execute calculation or data processing according to the interpreted commands. In addition, the processor 120 may be implemented to include the video conversion module 170. In that case, the processor 120 may process part or all of the functions of the video conversion module 170.

According to various embodiments of the present invention, the processor 120 performs a process for rendering 3D content and performs a process for displaying the rendered 3D content on the screen, in response to a user's 3D content displaying request (e.g., a 3D game execution, 3D multimedia data playback, etc.). In particular, when a request is made to display 3D content, the processor 120 renders 3D content according to a reference plane setup value preset by a 3D content displaying program producer (or determined according to a user's selection). As described above, the rendering operation may refer to a process for creating two, 2D images for the left and right viewpoints, from the content produced with 3D coordinates.

The memory 130 may store therein commands or data received from or created at the processor 120 or other elements (e.g., the input/output interface 140, the display 150, the communication interface 160, or the video conversion module 170, etc.). The memory 130 may include programming modules such as a kernel 131, a middleware 132, an application programming interface (API) 133, and an application 134. Each of the programming modules may be composed of software, firmware, hardware, and any combination thereof.

According to various embodiments of the present invention, the memory 130 stores data and programs for operating the electronic device. The memory 130, according to an embodiment of the present invention, stores various types of 3D content produced to have 3D coordinates and a program for rendering the 3D content and displaying the rendered 3D content on the display 150.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133 which is an interface for allowing the application 134 to control a function provided by the kernel 131 or the middleware 132 may include, for example, at least one interface or function (e.g., a command) for a file control, a window control, an image processing, a text control, and the like.

According to embodiments of the present invention, the application 134 may include a Short Messaging Service/Multimedia Messaging Service SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to the external electronic device 104. Additionally or alternatively, the notification relay application may receive notification information from the external electronic device 104 and offer the received information to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to embodiments of the present invention, the application 134 may include a specific application specified depending on attributes (e.g., a type) of an external electronic 104. For example, when an external electronic device is a motion picture experts' group audio layer 3 (MP3) player, the application 134 may include a specific application associated with music playback. Similarly, when an external electronic device is a portable medical device, the application 134 may include a specific application associated with a health care. According to an embodiment of the present invention, the application 134 include at least one of an application assigned to the electronic device 101 or an application received from an external electronic device (e.g., a HMT (head mounted theater) frame 106 or the external electronic device 104).

The input/output interface 140 delivers commands or data, entered by a user through an input/output unit (e.g., a sensor, a keyboard, or a touch screen), to the processor 120, the memory 130, the communication interface 160, or the video conversion module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the video conversion module 170 via the bus 110. For example, the input/output interface 140 may output voice data, processed through the processor 120, to a user through the speaker.

According to various embodiments of the present invention, the input-output interface 140 may receive a user's input for adjusting the sensitivity of the 3D screen in order to display 3D images. For example, the input-output interface 140 may receive a user's input for altering a particular setup value required for the reference plane setup in order to lower the sensitivity of the 3D screen and display 3D images at the low sensitivity (i.e., to reduce the difference between the left and right images).

The display 150 may display thereon various kinds of information (e.g., multimedia data, text data, etc.) to a user. The display 150 may be implemented with a Liquid Crystal Display (LCD), Organic Light Emitting Diode (OLED), Active Matrix Organic Light Emitting Diode (AM-OLED), or the like. The display 150 may visually provide the user with various kinds of information, such as menus of the electronic device, input data, function setup information, etc. The display 150 according to an embodiment of the present invention may display thereon images, movies, games, etc., which are produced in 3D. In addition, the display 150 may not perform a process for separating part of objects into the left and right images under the control of the processor 120. When the setting is made so that the process for separating part of objects into the left and right images is not performed, the stereoscopic vision of 3D screen images displayed through the display 150 may decrease and the rendering speed may increase.

In addition, according to an embodiment of the present invention, the display 150 may be implemented in such a way as to include two display areas in a wearable electronic device, such as a head mounted display (HMD). In this case, the display 150 may divide the display area into first and second display areas and display the left and right images thereon respectively. For example, the display 150 may display the left image on the first display area and the right image on the second display area. In addition, according to various embodiments, the electronic device may be installed to the frame of a head mounted theater (HMT) and cooperate with the HMT. When the electronic device is installed to the frame of the HMT, the electronic device may divide one display area of the display 150 into a first display area and a second display area to display them thereon. In this case, the display 150 may display images that the left see and images that the right eye see on the divided display areas, respectively.

The communication interface 160 performs communication between the electronic device 101 and any external electronic device 104 or HMT frame 106. For example, the communication interface 160 may communicate with any external device by being connected with a network 162 through a wired or wireless communication. A wireless communication may include, but not limited to, at least one of wireless fidelity (Wifi), bluetooth (BT), near field communication (NFC), global positioning system (GPS), or a cellular communication (e.g., long term evolution (LIE), LTE-advanced (LTE-A), code division multiple access (CDMA), wideband CDMA (WCDMA), universal mobile telecommunications system (UMTS), wireless broadband (WiBro), or global system for mobile communications (GSM), etc.). A wired communication may include, but not limited to, at least one of universal serial bus (USB), high definition multimedia interface (HDMI), recommended standard 232 (RS-232), or plain old telephone service POTS).

According to an embodiment of the present invention, the network 162 may be a communication network, which may include at least one of a computer network, an internet, an internet of things, or a telephone network. According to an embodiment of the present invention, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

According to various embodiments of the present invention, the video conversion module 170 may process at least part of the video information obtained from the other components (e.g., the processor 120, memory 130, input-output interface 140, communication interface 160, etc.) to provide the processed video information to the user in various modes. For example, the video conversion module 170 may render video information with 3D coordinates to be displayed on the screen into a video with two, 2D coordinates, by using the processor 120 or by being independent of the processor 120.

Figure 2:
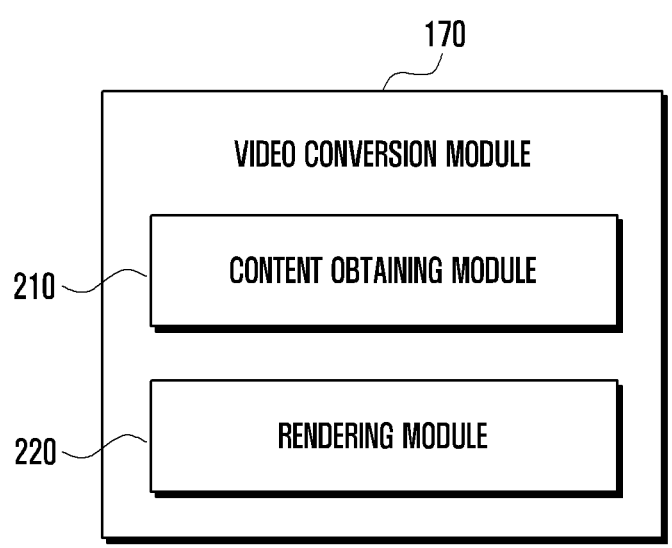
FIG. 2 is a schematic block diagram illustrating a video conversion module of an electronic device according to an embodiment of the present invention.

FIG. 2 is a schematic block diagram 200 of a video conversion module 170 of an electronic device (e.g., the electronic device 100 shown in FIG. 1) according to an embodiment of the present invention.

Referring to FIG. 2, the video conversion module 170 includes a content obtaining module 210 and a rendering module 220.

The content obtaining module 210 may obtain 3D content received from, for example, the electronic device 104 via wired/wireless communication. In addition, the content obtaining module 210 may obtain 3D content stored in the memory 130.

The rendering module 220 classifies locations of the respective objects forming the obtained 3D content based on the reference plane. For example, the rendering module 220 may determine whether an object of the obtained 3D content is located in/belongs to a foreground area, separate left and right area, or a background area, based on the reference plane. The rendering module 220 may create an object that belongs to the foreground area as a foreground image serving as a common image, and create an object that belongs to the background area as a background image serving as a common image. The rendering module 220 creates images that belong to the left-right separate area as a first right image and a first left image, separately and respectively. Next, the rendering module 220 may apply a particular offset value (s) to the first left image and the foreground and background images serving as a common image, respectively, to sequentially combine the first left image with the foreground and background images. Similarly, the rendering module 220 may apply a particular offset value(s) to the first right image and the foreground and background images serving as a common image, respectively, to sequentially combine the first right image with the foreground and background images. Therefore, the rendering module 220 creates a second left image serving as a final image by combining the first left image with the common images and a second right image serving as a final image by combining the first right image with the common images, respectively.

As described above, an electronic device according to an embodiment of the present invention includes a memory for storing three dimensional (3D) content and operation programs; a processor for detecting at least one reference plane set to the 3D content, in response to a request for displaying 3D content; classifying objects of images comprising the content, based on the reference plane; creating a first left image, a first right image and at least one common image, corresponding to the classified object; and combining at least one common image with the first left image and the first right image, respectively; and a display for displaying a second left image, created as the first left image is combined with at least one common image, and a second right image, created as the first right image is combined with at least one common image.

The processor may classify the entire area showing the objects into a background image area, separate left and right area and a foreground area, based on the reference; creates the first left image and the first right image from the objects in the separate left and right area; and create the common images from the objects in the background image area and the foreground image area, respectively.

The processor may set the reference plane as one side that includes a point at which a center line extending from the center of the viewpoints of both sides used for the rendering and a sightline of one side viewing the center line at a particular angle are crossed. The processor may set the particular angle to a preset, fixed value or a value set by a user. When one object exists across both areas of the reference plane, the processor may: process the object as a single object; or separate the object into two objects to process the separated objects. The processor may process the object as a single object to create a first left image and a first right image from the object or to create common images from the object.

When a disparity (shift) occurs between the combined images, the processor applies offset values to the combined common images respectively, and removes the disparity. Disparity (shift) refers to the distance between two corresponding points in the combined images, such as points in the left and right image of a stereo pair. The processor may set the offset value to a value corresponding to the distance between the center of the viewpoints of both sides used for the rendering and the viewpoint of one side. In order to remove the disparity (shift), the processor may shift the common image combined with the first left image to the right by an offset value, and shift the common image combined with the first right image to the left by an offset value.

In the following description, the concept of 'rendering' in accordance with embodiments of the present invention is explained referring to FIG. 3. FIG. 3 shows images that describe the concept of a rendering operation according to various embodiments of the present invention. As shown in FIG. 3, a first image 300 is a 3D image of an object produced by 3D coordinates, before a rendering operation is performed. In order to display the image 300 in 3D or stereoscopically on the electronic device, an image 310 corresponding to seeing the object from the left viewpoint (called a left image) is obtained, and an image 320 corresponding to seeing the object from the right viewpoint (called a right image) is obtained and separately displayed. It would be obvious that, like the images 310 and 320, the user may see and perceive the same object at different positions or angles according to the user's viewpoints. As shown in image 300, one point 301 of the object may have coordinates, e.g., three coordinates (1, 1, 1) related to the three axes. As the rendering process is performed, the same point 301 of the object in the left image 310 has coordinates (2, 1), and the same point 301 of the object in the right image 320 has coordinates (−1, 1). As such, 'rendering' may refer to an operation for displaying an image of an object having 3D coordinates as two images having 2D coordinates. Although the embodiment of FIG. 3 is an example altering 3D coordinates to a pair of 2D coordinates, this example is not related to the coordinate calculating method in a real rendering operation in accordance with embodiments of the present invention.

The processor 120, according to an embodiment of the present invention may perform a rendering process so that an object located closer to the user's visual field than the reference plane in rendering (e.g., objects in the left and right area) and an object located farther from a user's visual field than the reference plane (e.g., an object in the background area) are processed separately. For the sake of convenient description, the following example is described based on a virtual space of X-, Y-, and Z-axes. It is assumed that: X-, Y- and Z-axes are the width axis, the height axis, and the front and back (depth) axis of the screen, respectively; the reference plane is the X-Y plane; and the position of the reference plane varies according to the coordinate value on the Z-axis. It is also assumed that the larger the Z coordinate value, the closer the reference plane is to the user's viewpoint. Accordingly, an object in front of (above) the reference plane may be expressed as a larger object having a Z value greater than that of the reference plane. Similarly, an object behind the reference plane may be expressed as a smaller object having a Z value less than that of the reference plane.

When the processor 120 separates a 3D content image to create the left and right images, it may use only an object (or objects) in a particular area (e.g. left and right areas) in front of a reference plane. That is, the processor 120 may not perform a separation process for an object behind a reference plane and may leave the object(s) as common images. The processor 120 may combine the common images created by the objects behind the reference plane with the left and right images created by using the object in front of the reference plane, respectively. The processor 120 may create the final left and right images to be displayed for the user through the combination process. When an image of an object in front of a reference plane and an image of an object behind the reference plane are combined with each other, an error may occur, e.g., a distortion of a combined image caused by a mismatching of the center points between images to be combined. In the present example, the processor 120 applies an offset value to the combined image to remove the distortion phenomenon between an object in front of a reference plane and an object behind the reference plane. In addition, the processor 120 may perform various operations (e.g., detecting a position of a reference plane, determining whether a setup value for a reference plane is altered, etc.) required to implement a 3D screen image by using 3D content.

Figure 4A:
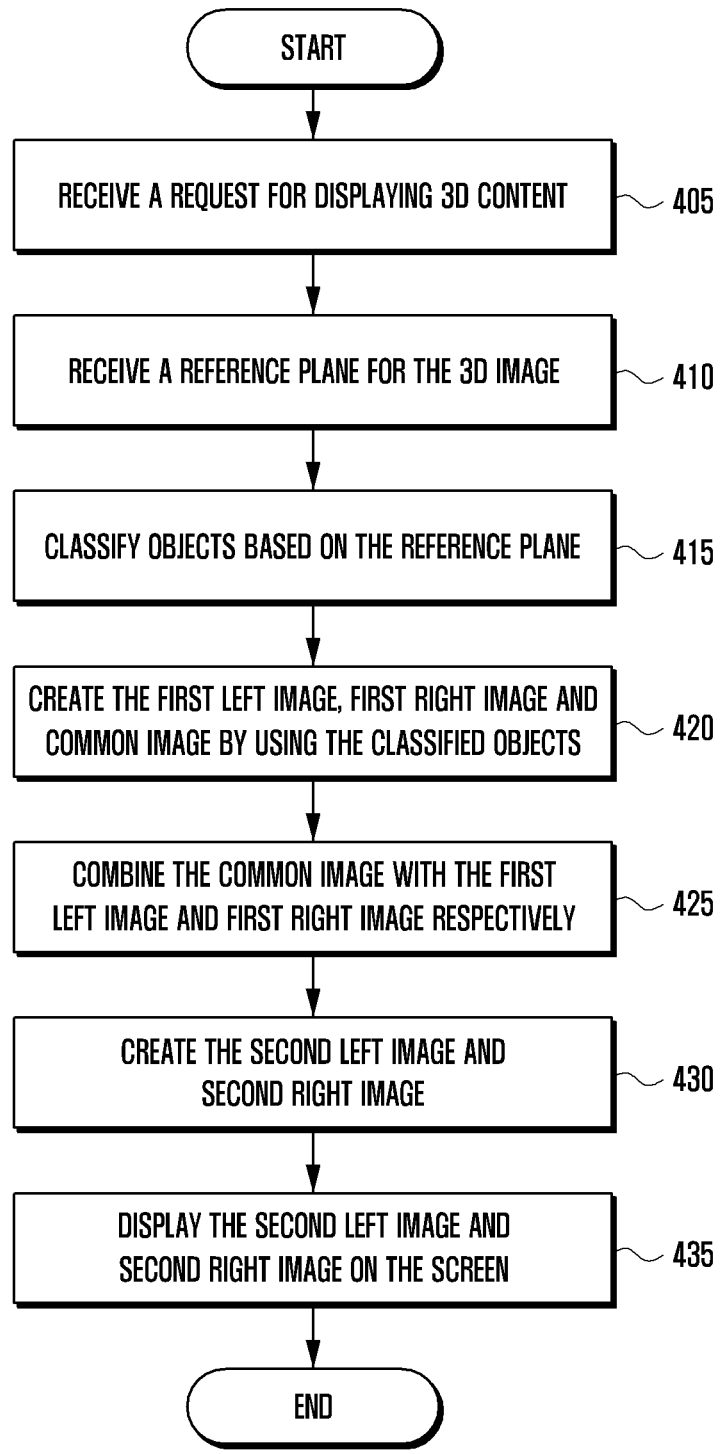
FIGS. 4A and 4B are flow diagrams illustrating a method of implementing a 3D screen image according to an embodiment of the present invention.
Figure 4B:
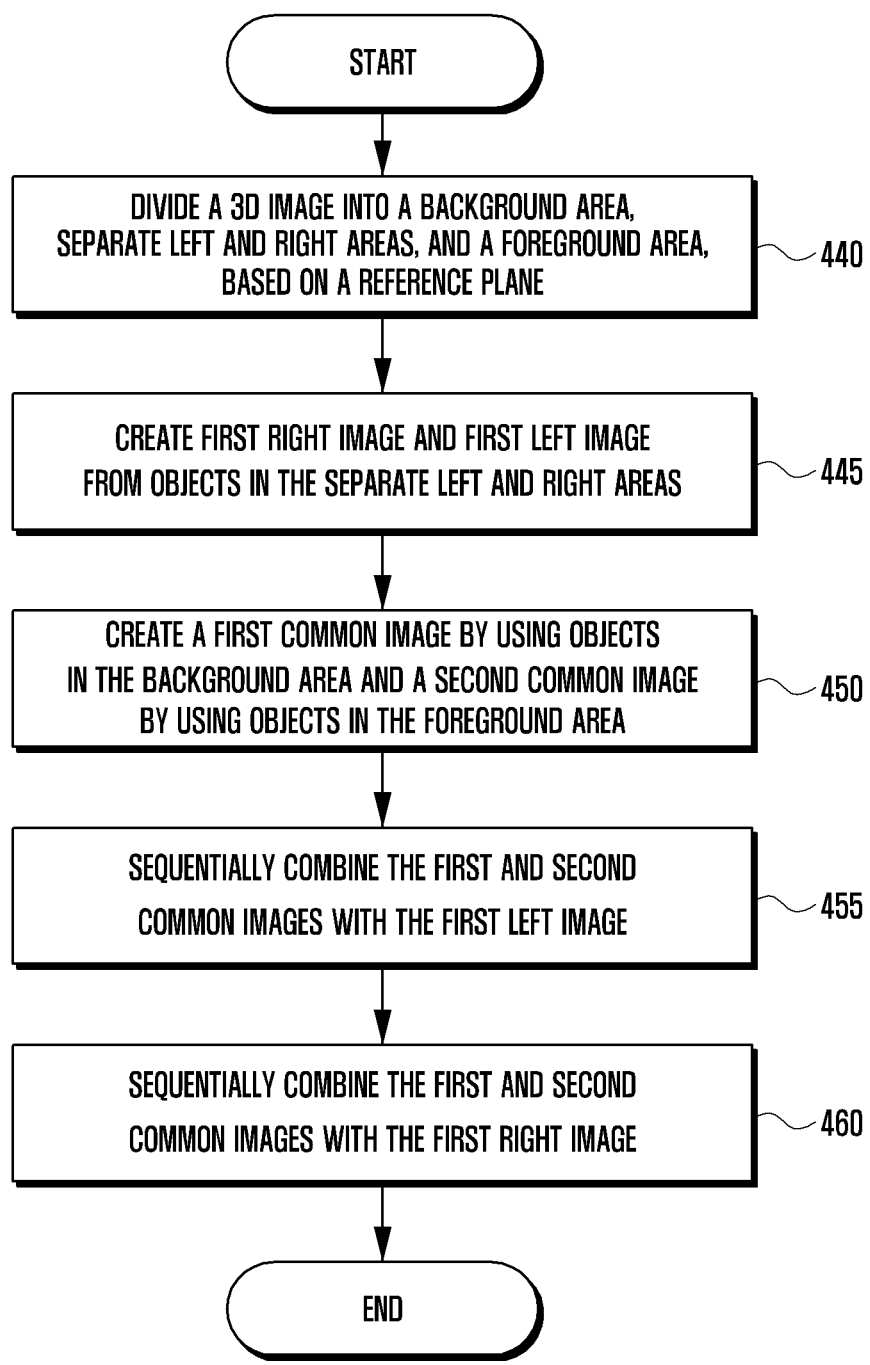

A method of implementing a 3D screen image is described as follows with reference to FIGS. 4A and 4B to FIG. 9. FIGS. 4A and 4B are flow diagrams illustrating a method of implementing a 3D screen image according to an embodiment of the present invention.

Referring to FIG. 4A, the processor 120 detect a request for displaying 3D content in operation 405.

Operation 405 may include, for example, detecting a request to execute a 3D game. When detecting a request to display 3D content, the processor 120 determines a reference plane for the 3D image to be rendered in the 3D content, in operation 410.

The reference plane is a standard for distinguishing between an object to be divided into two types of images (left and right images) and an object to be commonly displayed. The reference plane may be set as a default value in the process of producing 3D-related programs or may be altered according to a user's requirements. For example, when an electronic device with low specifications (i.e., low processing capabilities) performs a rendering operation, or when an electronic device renders a large capacity of 3D content, the user may adjust the location of the reference plane to create common images from as many objects as possible, thereby increasing the rendering speed. There also may be one or two reference planes, e.g., first and second reference planes.

After confirming the reference plane in a 3D image to be rendered in operation 410, the processor 120 classifies objects based on the reference plane in operation 415. Next, the processor 120 creates a first left image, a first right image, and common images from the classified objects, in operation 420. More specifically, the processor 120 does not necessarily separate the entire object in the image into left and right images. Instead, the processor 120 may also classify particular objects to be displayed as common images. A method for classifying objects and a method for creating images are described in detail later herein with reference to FIGS. 5A to 7D.

After creating the first left image, first right image, and the common image in operation 420, the processor 120 combines the common image with the first left image and first right image respectively, in operation 425, and thus creates the second left image and second right image from the 3D image, in operation 430. As such, when completing the rendering operation in which the second left image and second right image as final images are created, the processor 120 displays the created second left image and second right image on the screen, in operation 435. For example, when an electronic device is equipped with two displays, e.g., an HMD or an HMT, the electronic device may display the second left image and second right image on the two respective separated display areas (a first display area and a second display area). In addition, the electronic device may simultaneously display both the second left image and second right image on each of the displays 150. When selecting this display method, the user may see the second left image and second right image filtered through polarized glasses with the left and right eyes, respectively.

Operations 415 to 425 are explained in detail as follows with reference to FIG. 4B.

Referring to FIG. 4B, the processor 120 divides a 3D image to be displayed into a background area, separate left and right area, and a foreground area, based on a reference plane, in operation 440. For example, the processor 120 may divide the 3D image such that: an area farther from the visual field than the first reference plane is set as a background area; an area between the first reference plane and the second reference plane is set as separate left and right area; and an area closer to the visual field than the second reference plane is set as a foreground area. The background area may include an object that is located so far away from the visual field that the difference between visual angles by the left and right eyes is indiscernible. The foreground area may include an object that is so close to the user's visual field that it can be displayed in 2D. For example, the foreground area may include menu windows, subtitles, etc.

The processor 120 creates a first right image and a first left image by using objects in the separate left and right area in operation 445. The processor 120 creates a background image (a first common image) by using objects in the background area and a foreground image (a second common image) by using objects in the foreground area, in operation 450.

The first reference plane and/or second reference plane may be created according to certain conditions. For example, when only a first reference plane exists, the image may be only divided into separate left and right area and a background area. When it is assumed that a foreground area and separate left and right area have been only created without a background area; objects corresponding to subtitles are in the foreground area; and simple objects are only in the separate left and right area, the processor 120 may process the simple objects to be separated for both eyes, and the subtitles to create a common image.

The processor 120 sequentially combines the first and second common images with the first left image, in operation 455. After the sequential combination of the first and second common images with the first left image in operation 455, the second left image may be created. The first and second common images are not essential elements for creating the final image and either one of the first and second common images may be used to create the final image. The processor 120 sequentially combines the first and second common images with the first right image, in operation 460. After the sequential combination of the first and second common images with the first right image in operation 460, the second right image is created.

An object classifying method and an image creating method, which are described above with reference to FIG. 4A, are explained in further detail as follows with reference to FIGS. 5A to 7D.

Figure 5A:
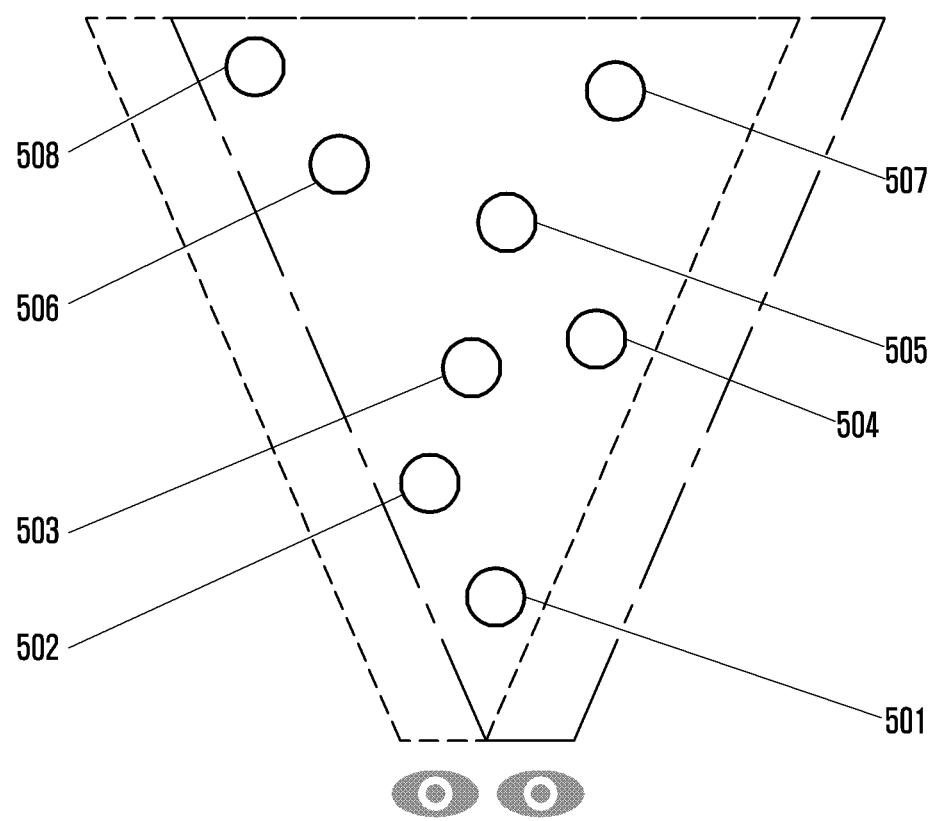
FIGS. 5A to 5C are diagrams illustrating alterations in locations of objects when performing a rendering operation according to an embodiment of the present invention.
Figure 5B:
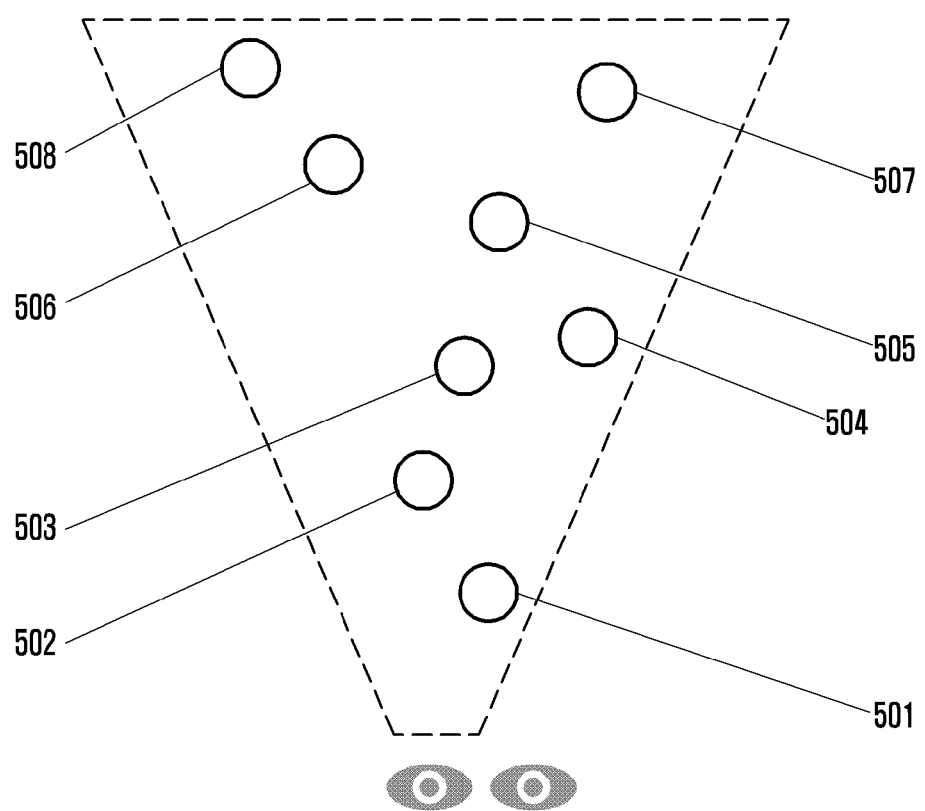
Figure 5C:
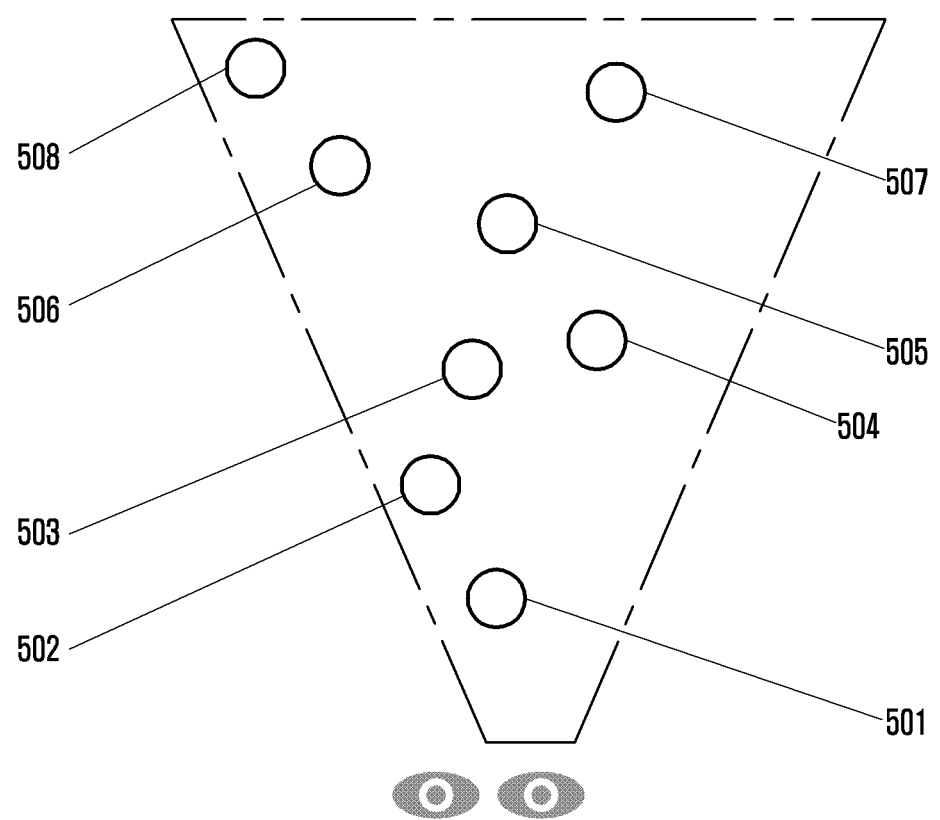

FIGS. 5A to 5C are diagrams illustrating the alteration in location of objects when performing a rendering operation according to an embodiment of the present invention.

FIG. 5A illustrates one image of 3D content showing eight objects. The locations of the objects shown in FIG. 5A correspond to the locations that the user can see with both the eyes. The image of FIG. 5A may be rendered to be separated into two types of images (left image and right image) as shown in FIGS. 5B and 5C, respectively. The locations of the eight objects in the image shown in FIG. 5B differ from the locations of the same eight objects in the image shown in FIG. 5C. More specifically, the locations of the eight objects in the image shown in FIG. 5B correspond to the image seen at a visual angle of the left eye, and the locations of the eight objects in the image shown in FIG. 5C correspond to the image a visual angle of the right eye. Therefore, when an image has many more objects (e.g., more than eight objects shown in the present example), the respective objects are separately displayed at different locations, and this separation causes the amount of calculation in rendering to increase and the rendering speed to decrease.

Figure 6:
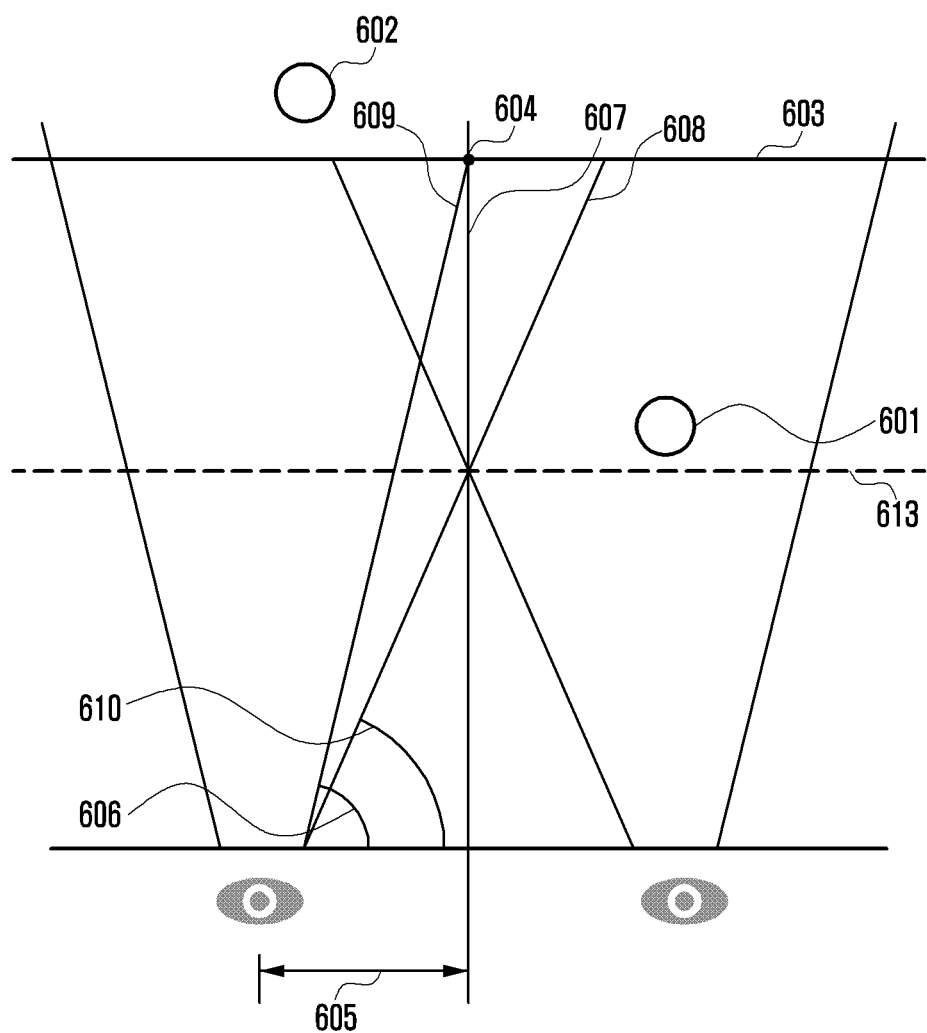
FIG. 6 is a diagram illustrating a reference plane according to an embodiment of the present invention.

However, according to an embodiment of the present invention, the locations of the objects are divided into two parts, based on the reference plane 603 shown in FIG. 6, so that objects to be displayed and objects to be commonly displayed can be separately displayed on the divided parts, respectively.

FIG. 6 is a diagram showing a reference plane according to an embodiment of the present invention.

According to an embodiment of the present invention, one first reference plane is determined as a plane 603. On plane 603, there is a point 604 that is formed as a viewpoint of one side (or a sightline) 609 at an angle 606 and a line 607 perpendicularly extending from the intraocular distance at the center of the intraocular distance (hereinafter, a center line) are crossed. In that case, the angle 606 is formed by the sightline 609 extending to the center line 607 and the plane of the image. In other words, the plane 603 passes through point 604, which is located at an intersection between the sightline 609 and the centerline 607, which is centered between the left and right eyes.

The angle 606 may vary according to a user's settings. When an angle for determining the reference plane is a value indicated by the reference number 610 instead of angle 606, the sightline from the left viewpoint (eye) travels, as indicated by reference number 608, and a reference plane 613 is created. As shown by the examples of angles 606 and 608, the larger the angle of the field of view (FOV), the farther the relative location of the reference plane from the user's viewpoint. Also, the smaller the angle of FOV, the closer the relative location of the reference plane is to the user's viewpoint. The reference plane may alter (or move) the location along the Z-axis according to the variation in Z-axis value in a virtual space of X-, Y-, and Z-axes (assuming that X-, Y- and Z-axes are the width axis, the height axis, and the front and back (depth) axis of the screen, respectively). For example, when it is assumed that the larger the Z-coordinate value, the closer the reference plane is to the user's viewpoint, the larger the particular angle, the smaller the Z-coordinate value of the reference plane.

The objects in the image may be divided based on the first reference plane 603. Since object 601 is in the left-right image area in front of the first reference plane 603, it may be formed as two types of images (a first left image and a first right image). On the other hand, object 602 may be formed as a common image in the background image area behind the reference plane 603.

In performing a rendering operation according to an embodiment of the present invention, the common image, which is created from an object in the background image area behind the first reference plane 603, and the first left image or the first right image, which is created as an object in the left-right image area in front of the first reference plane 603, can be combined. In this case, a mismatching phenomenon may occur between the combined images. In order to resolve this mismatching phenomenon, an offset value may be applied to the mismatched image. The offset value may be set as a value corresponding to a distance 605 between the center line 607 and the left eye (which refers not to a user's eye but a viewpoint used to create the left image). In addition, the offset value may refer to a variation of location values of the combined common image. In the present example, when the offset value is applied to the left image, the offset has a positive value (e.g., +1). When the offset value is applied to the right image, the offset has a negative value (e.g., −1). Accordingly, when the offset value is applied to the left image the common image may be shifted to the right by the same offset value. When the offset value is applied to the right image, the common image may be shifted to the left by the same offset value.

FIGS. 7A to 7D are diagrams illustrating the alteration in location of objects when performing a rendering operation according to an embodiment of the present invention.

Figure 7A:
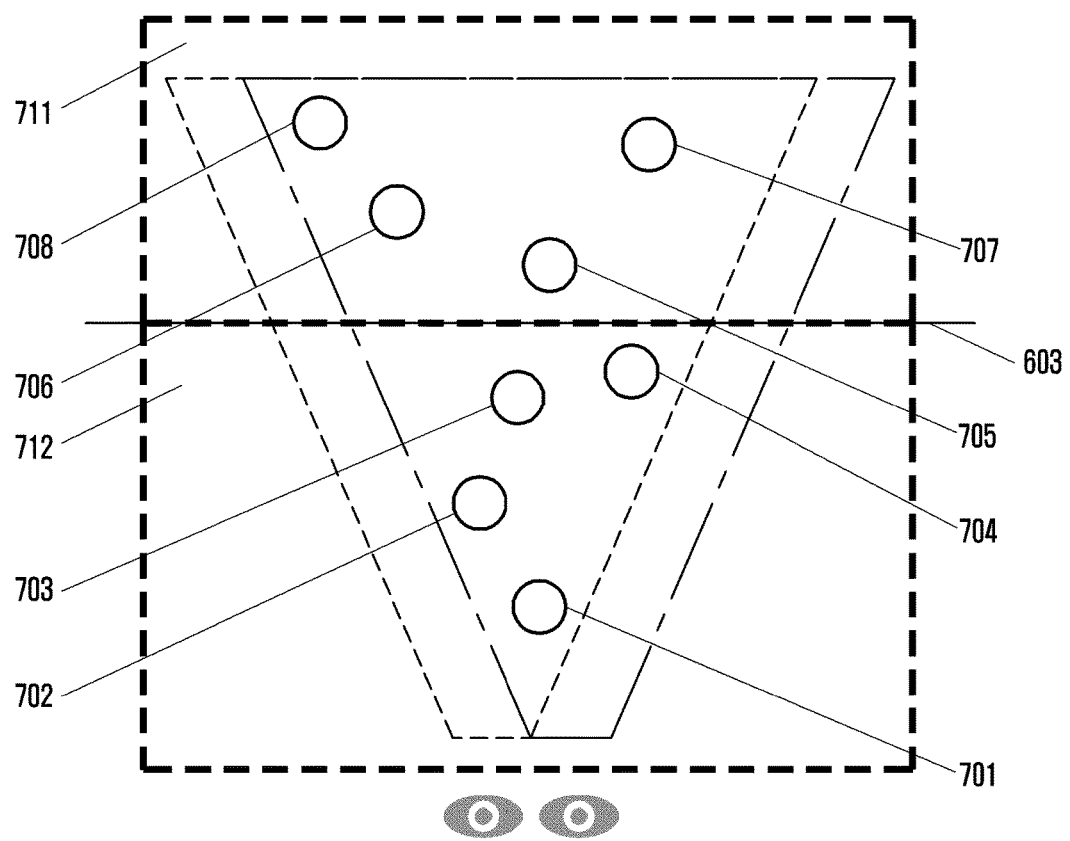

Operation 425 of FIG. 4A is described in detail with reference to FIGS. 7A to 7D. FIG. 7A is a diagram illustrates a method of dividing, when rendering a 3D image, objects in the image into objects (that have a Z-coordinate value greater than that of the reference plane) in front of the first reference plane 603 and objects (that have a Z-coordinate value less than that of the reference plane) behind the first reference plane 603. In the present example, objects in the area 712 in front of the first reference plane 603 are in an area so that they appear more closely to the user's visual field. By contrast, since area 711 is behind the first reference plane 603, the difference between visual angles at which the left and right eyes see for objects in area 711 is relatively small. As described above, each of the objects 701, 702, 703, and 704 in the area 712 in front of the first reference plane is set to have different coordinates in two images as a first left image and a first right image. Meanwhile, the objects 705, 706, 707, and 708 in the area 711 behind the reference plane are set as common images.

Figure 7B:
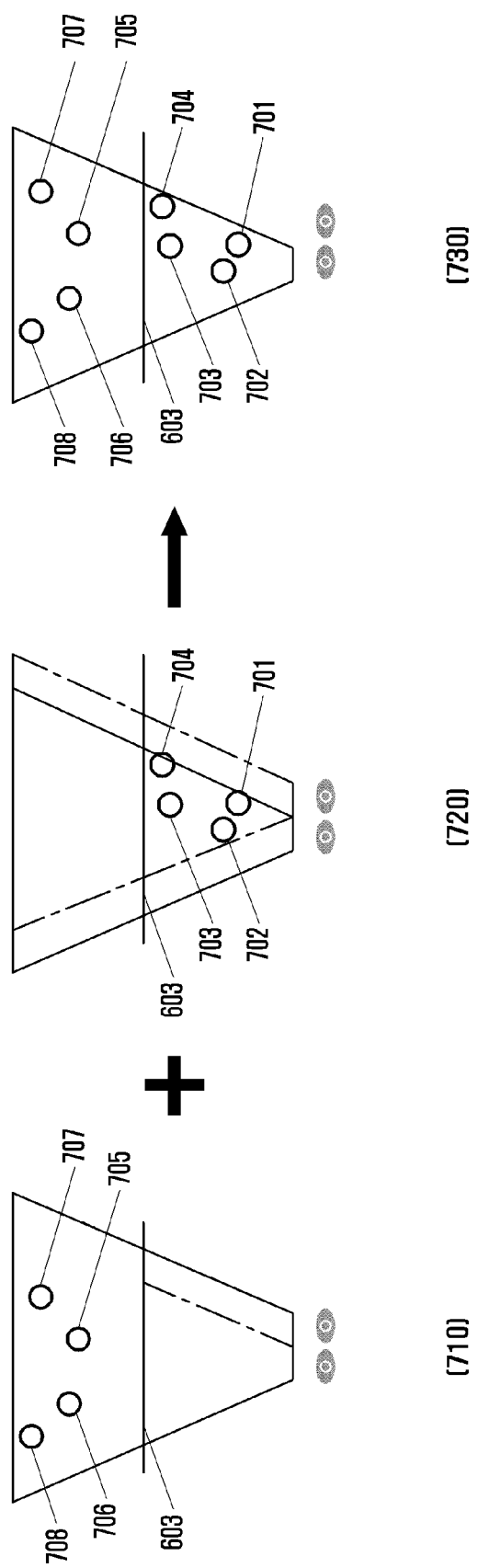
Figure 7C:
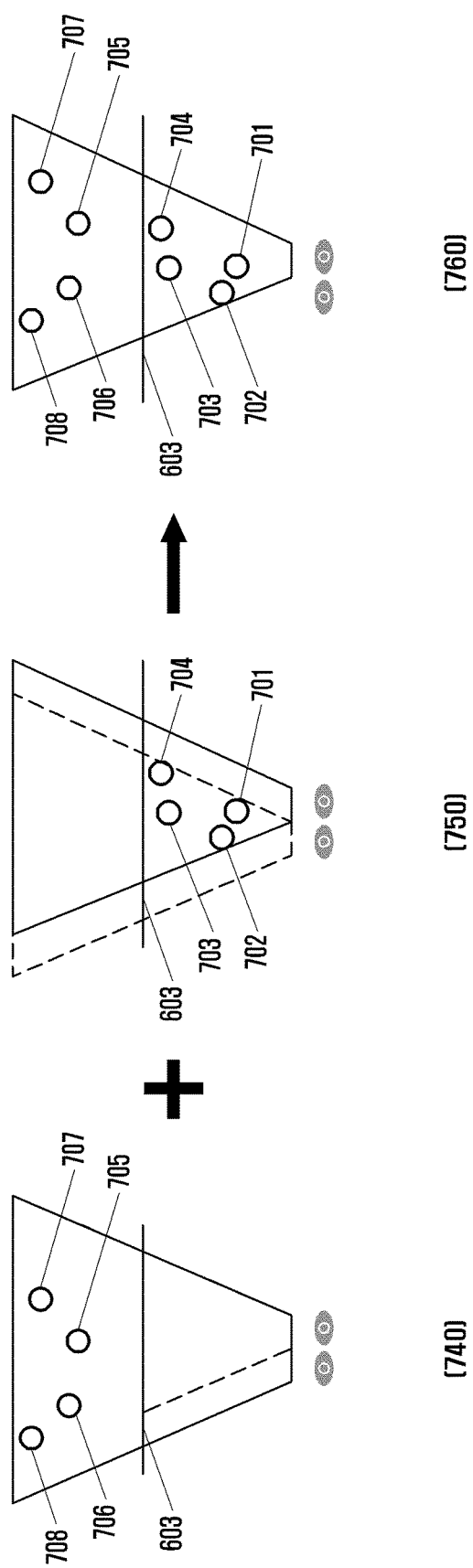

FIGS. 7B to 7D are diagrams illustrating image creation processes according to an embodiment of the present invention. A left image created in rendering (which is called a second left image) is created by combining the first left image with the common image. Image 710 of FIG. 7B is a common image (or background image) created by objects in the background image area behind the first reference plane 603. The image 720 is a first left image created by objects in the left-right image area in front of the first reference plane 603. The objects 701, 702, 703, and 704 in the left-right image area, shown in diagram 720, are gathered in the right side of the left field of vision. The second left image 730 is obtained by combining the first left image 720 with the common image 710.

FIG. 7C is a series of diagrams illustrating an operation for obtaining a second right image. Diagram 740 of FIG. 7C shows objects in the background image area and is the same as the diagram 710 of FIG. 7B. Diagram 740 is a background image as a common image, created by objects 705, 706, 707, and 708 located at locations relatively farther from the viewer than the first reference plane 603. Diagram 750 shows a first right image created by objects 701, 702, 703, and 704 located in front of the first reference plane 603. The objects shown in diagram 750 are gathered on the left side of the right field of vision. When the first right image 750 is combined with the common image 740, a second right image 760 is obtained.

The creations of a common image from objects in the background image, and a first left image and a first right image from objects in the left-right image area, with respect to the first reference plane 603, were described above.

A method of rendering objects across the reference plane is described as follows with reference to FIG. 7D.

Diagram 770 of FIG. 7D shows an object 771 that extends across both sides of the first reference plane 603, such that a part of the object 771 is in front of the first reference plane 603 and the other part of object 771 is behind the first reference plane 603. The object 771 may be displayed on the real screen as shown in diagram 780 of FIG. 7D. The object 771 extending across the first reference plane 603 may be processed as a single object, based on one of the parts in front of and behind the first reference plane 603, according to a default value or a user's setup value. For example, when the user has created a setup so that the object 771 extending across the first reference plane 603 is processed as an object in the background image area corresponding to an area behind the reference plane, the object 771 is rendered to create a background image, or a common image, including part 781 and part 782 of the object 771, which correspond to front and rear portions of the object, 771, respectively.

In addition, the object 771 may be divided into two types of objects with respect to the first reference plane 603. More specifically, the object 771 may be divided into polygons in front of the first reference plane 603 and polygons behind the first reference plane 603. The term 'polygon' refers to a figure serving as a basic unit forming each object, e.g., a triangle, etc. One object may be comprised of a plurality of polygons. One object 771 extending across the first reference plane 603 may be divided into two sets of polygons, corresponding to a part of the object in front of the first reference plane 603 and the other part of the object behind the first reference plane 603. The polygon set in front of the first reference plane 603 creates a first left image and a first right image, and the polygon set behind the first reference plane 603 creates a common image.

Referring to diagram 780 of FIG. 7D, although there is only a single object 771, when the object 771 is rendered, polygons comprising part 781 of the object 771 in front of the first reference plane 603 and polygons comprising part 782 of the object 771 behind the first reference plane 603 may be classified and processed as if they are separate objects. For example, polygons corresponding to the part 781 are divided into a first left image and a first right image, and polygons corresponding to the part 782 are processed to create a common image.

According to another embodiment of the present invention, when a particular object is across the reference plane, the processor 120 re-defines the location of the reference plane according to the attribute of the object. The location of the reference plane may be set to have a range of error. In that case, when an object across the first reference plane is not able to be processed, as the object is divided into two sets of polygons, the location of the reference plane may be altered within the range of error. Examples of an object that cannot be divided into two sets of polygons are images with a relatively low level of complexity, such as, letters, icons, etc. On the other hand, although objects with a relatively high level of complexity are divided into two sets of polygons and processed, it is probable that the user may not recognize the processed result. Therefore, according to various embodiments of the present invention, when the processor 120 renders an object across the first reference plane, the processor 120 may detect the complexity based on a standard, such as the number of polygons comprising the object, etc., and may determine a condition as to whether to divide the object.

The above description of an embodiment of the present invention refers to a division and creation from an image into a common image and a left-right image with respect to the first reference plane 603. However, the above-described embodiment may be modified into various alternative embodiments so that a second reference plane may be additionally created and objects may be classified into, with respect to the second reference plane, objects created as a common image and objects created as a left-right image. For example, as described above referring to FIG. 4B, objects may be classified according to a background area, a foreground area and separate left and right area. This process is described in detail as follows with reference to FIGS. 8 and 9.

Figure 8:
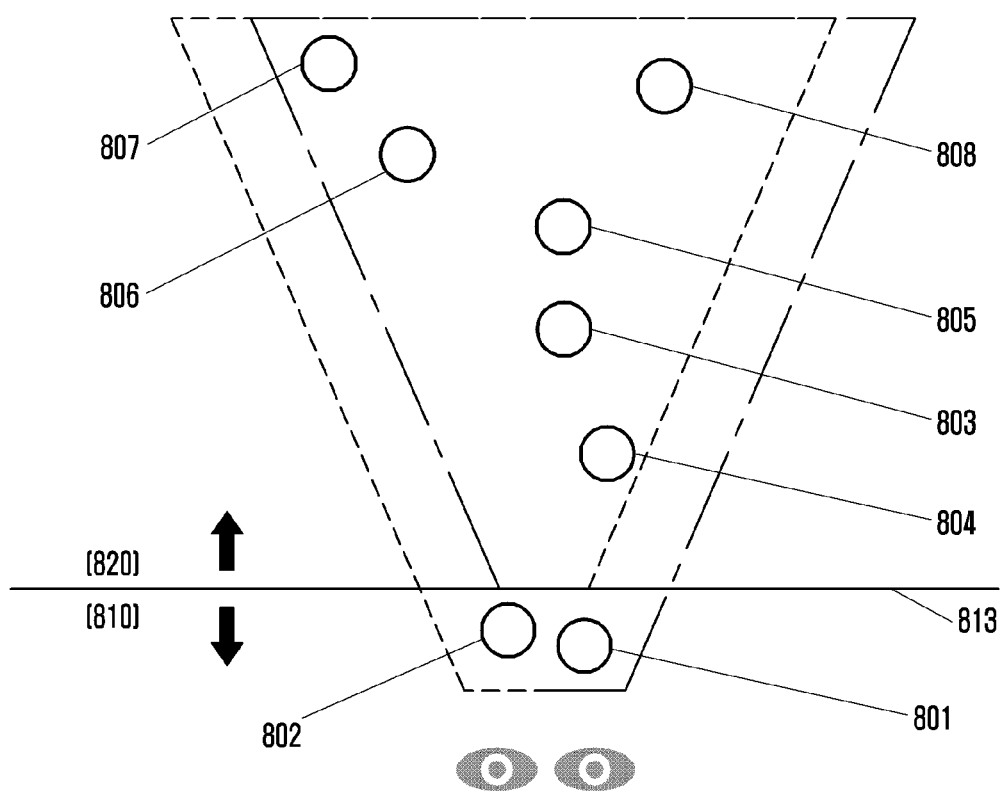
FIG. 8 is a diagram illustrating an area displaying objects, divided based on the second reference plane, according to an embodiment of the present invention.

FIG. 8 is a diagram illustrating a method of classifying objects into objects to create a common image and objects to create a left-right image, based on a second reference plane, according to an embodiment of the present invention.

Referring to FIG. 8, objects are divided into objects located in a foreground area 810 and objects located in separate left and right area 820, with respect to the second reference plane 813. The objects in the foreground area 810 are used to create a foreground image, or a common image. The objects used to create a foreground image correspond to reference numbers 801 and 802. Examples of the objects 801 and 802 are 2D objects, such as a subtitle, a menu screen, etc. Objects in the separate left and right area 820 correspond to reference numbers 803, 804, 805, 806, 807, and 808.

Figure 9:
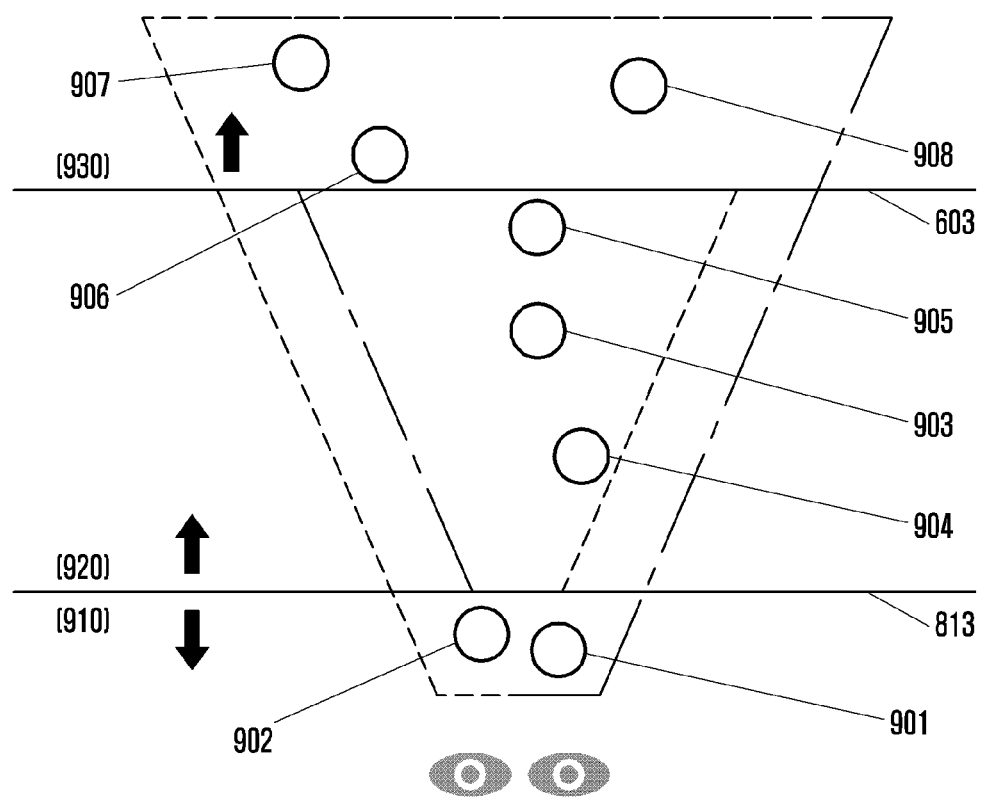
FIG. 9 is a diagram illustrating an area displaying objects, divided based on the first and second reference planes, according to an embodiment of the present invention.

FIG. 9 is a diagram illustrating a method of classifying objects based on reference planes, according to an embodiment of the present invention. More particularly, FIG. 9 shows an object classification method in an example in which both the first reference plane 603 and the second reference plane 813 exist. When both the first reference plane 603 and the second reference plane 813 exist, an area where objects exist is divided into three types. The area between the first reference plane 603 and the second reference plane 813 is classified into separate left and right area 920. The area farther away from the FOV than the first reference plane 603 is classified as a background area 930. Objects 903, 904, and 905 in the separate left and right area 920 are classified as a first left image and a first right image. Objects 901 and 902 in the foreground area 910 are used to create a foreground image or a common image. Objects 906, 907, and 908 in the background area 930 are used to create a background image. The background image refers to a common image created by objects, such that the difference between the locations of each object that the left and right eyes see is relatively small. Meanwhile, the foreground image refers to a common image created by 2D objects (e.g., subtitles) that are located very close to the FOV of a user. Since the foreground image and the background image are commonly created images, when they are combined with the first left image or first right image, a mismatch phenomenon may occur between the combined images. In the following description, a method of correcting an image mismatch is explained in detail with reference to FIGS. 10A to 12.

FIGS. 10A to 10E are diagrams illustrating a method of creating a final image according to an embodiment of the present invention.

FIGS. 10A to 10E are diagrams comparing a result obtained by a method that classifies all objects into left-right images and rendering the images irrespective of relative locations of objects with that obtained by a method according to an embodiment of the present invention. Respective objects forming images shown in diagrams 1005 to 1017 are arranged in the same manner as objects shown in diagram 1001. As shown in diagram 1001, the larger the Z coordinate value of an object, the closer the object is to the user's viewpoint. For example, of the objects 1 to 4 shown in diagram 1001, object 1 is the closest to the user's viewpoint and object 4 is the farthest from the user's viewpoint. Objects 1 and 2 are closer to the user's viewpoint than the first reference plane 603. Objects 3 and 4 are farther away from the user's viewpoint than the first reference plane 603.

Figure 10A:
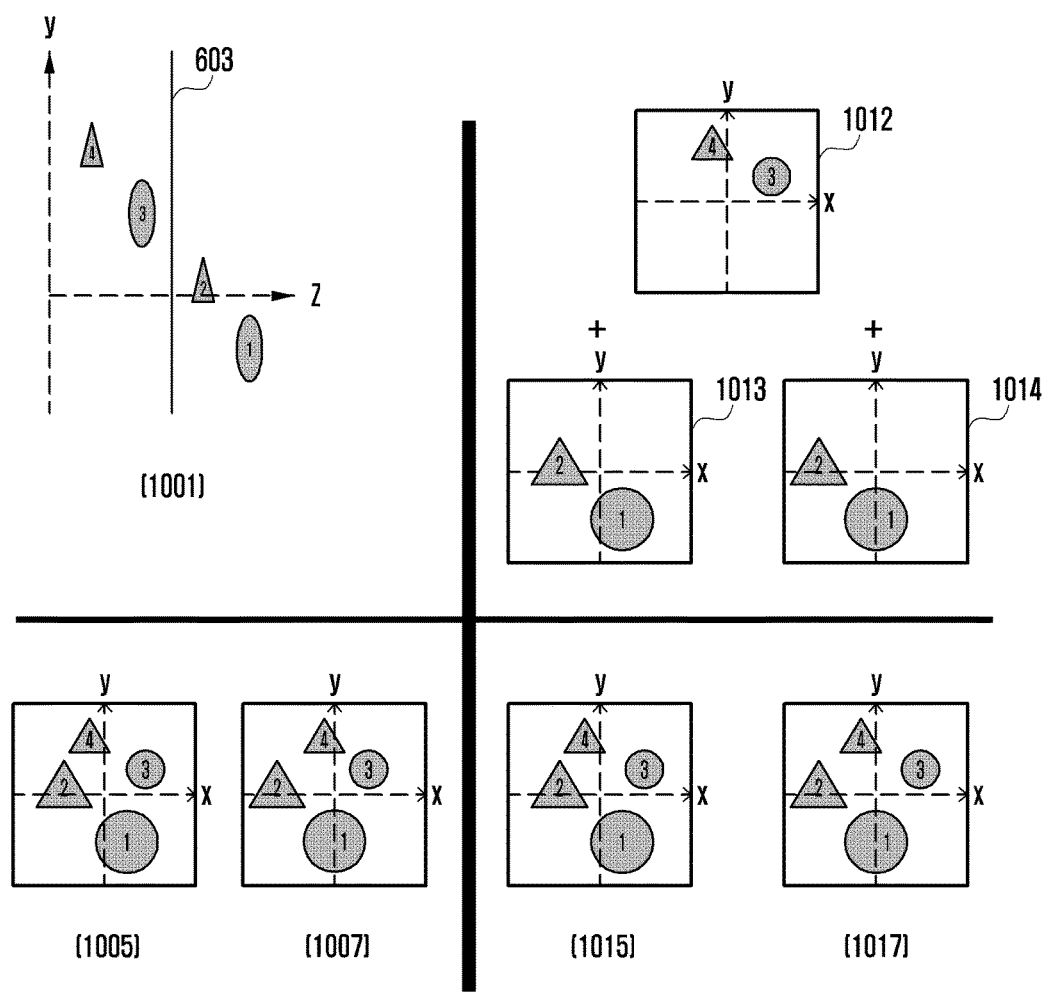

Diagrams 1005 and 1007 of FIG. 10A show final images created when all the objects shown in the diagram 1001 are separately rendered to the left and right images. Diagrams 1015 and 1017 show the final images according to an embodiment of the present invention. Diagram 1015 shows a final image created as the first left image 1013 and the background image 1012 are combined with each other.

Diagram 1017 shows the second right image created as the first right image 1014 and the background image 1012 are combined with each other.

In the following description, the final images shown in diagram 1005 and 1007 of FIG. 10A are explained in detail referring to FIG. 10B. In addition, the final images shown in diagram 1015 and 1017 of FIG. 10A are also explained in detail referring to FIG. 10C.

FIG. 10B shows the final left image 1005 and final right image 1007 created as all the objects are separated into left and right images and are rendered. In the images 1005 and 1007, the objects may be displayed such that their respective distances between them differ from each other. For example, objects 3 and 4 may be shown as if the distance between objects 3 and 4 is relatively large in the image 1005, but as if the distance between objects 3 and 4 is relatively small in the image 1007. In addition, objects 4, 2, and 1 may be shown as if the distance between object 4 and object 2 or 1 in the image 1005 differs from that in the image 1007. As such, when all the objects are separated into the right and left objects and they are rendered, the locations of the respective objects shown in the final left image 1005 and final right image 1007 may differ from each other. On the other hand, the rendering method according to an embodiment of the present invention may show the objects, part of which are shown so that their intervals are the same in the left and right images. This embodiment of the present invention is described below referring to FIG. 10C.

FIG. 10C shows the final left image (second left image) 1015 and the final right image (second right image) 1017 obtained from the result rendered according to an embodiment of the present invention. Objects 3 and 4 forming the images 1015 and 1017 are images obtained from the common image 1012 (shown in FIG. 10A). Therefore, objects 3 and 4 are shown so that the interval between the objects 3 and 4 in the image 1015 is identical to the interval in the image 1017. In addition, the images 1015 and 1017 are the images created as the common image is combined with the first left image or the first right image without the application of an offset value. When a rendering operation is performed according to an embodiment of the present invention, the locations of objects in the left and right images differ from each other by a distance between the left eye for creating the left image and the right eye for creating the right image; however, the locations of objects in the common images are identical to each other, and thus location errors of the common images may occur. In order to resolve the errors, the embodiment of the present invention may include an offset value applying process (e.g., a left-right shifting process). The offset value applying process will be described in detail later referring to the accompanying drawings.

Figure 10D:
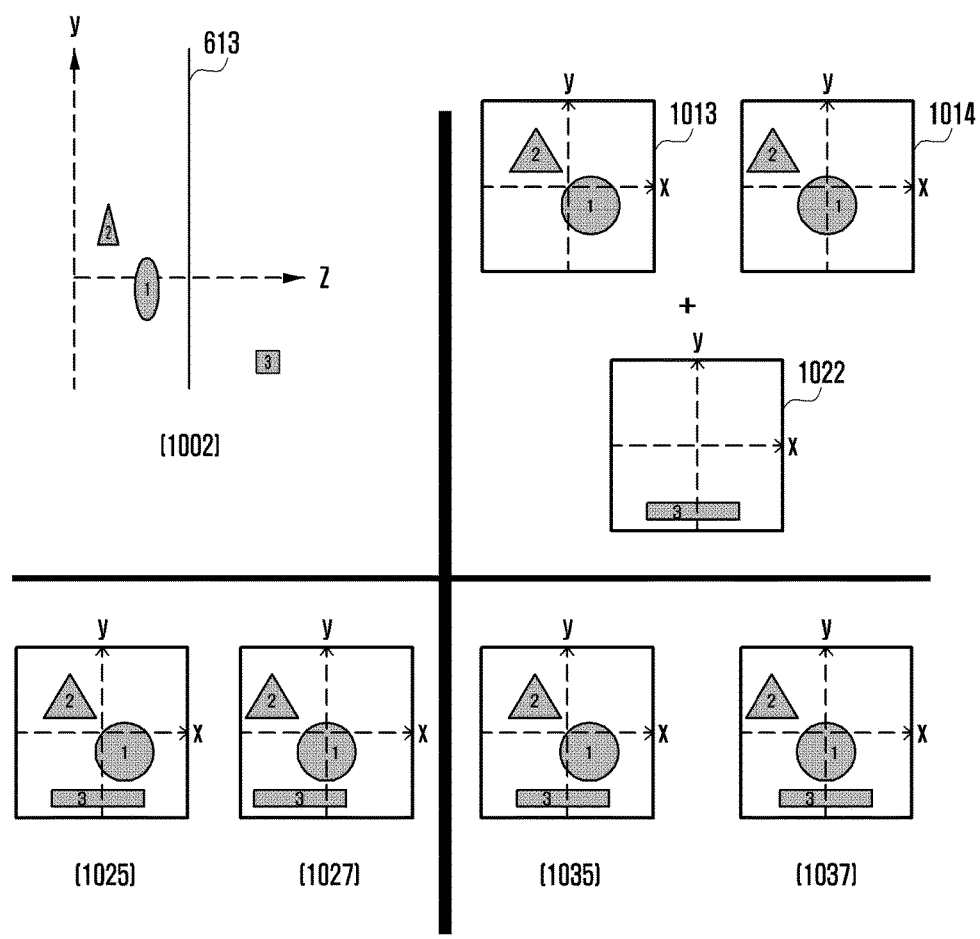

FIG. 10D illustrates the process for combining the foreground image 1022 (i.e., the common image) with the first left image 1013 and the first right image 1014, where the relative locations of objects contained in the respective images are illustrated in diagram 1002. The foreground image refers to a 2D image very close to the user's viewpoint. When an object is very close to the user's view, the difference between the distances to the object from the left eye and the right eye is generally the largest. However, the distance difference does not need to be considered when a 2D image is rendered. Therefore, a 2D image very close to a user's viewpoint may be set as a common image (or foreground image). Examples of the objects that may be set as a foreground image are 2D images, such as subtitles, pop-up windows, etc.

Referring to diagram 1002 of FIG. 10D, the locations of objects in the image of FIG. 10D may also be shown according to the Z-axis coordinates. The larger the Z-axis coordinate value of an object in the diagram 1002, the closer the object is to the user's viewpoint. As shown in diagram 1002 of FIG. 10D, foreground object 3 is closer to the user's viewpoint than the second reference plane 613, and objects 1 and 2 are farther from the user's viewpoint than the second reference plane 613.

When all the objects shown in diagram 1002 are separated into the left and right images and the objects are rendered without setting a reference plane, the left image and right image are ultimately created as shown in diagrams 1025 and 1027, respectively. As described above referring to FIG. 10B, the objects shown in the left image 1025 and the right image 1027 may be displayed, at different locations from each other, with the different distances between them. On the other hand, when a rendering operation is performed according to an embodiment of the present invention, the first left image 1013 is combined with the foreground 1022, or a common image, and thus the second left image 1035 is created. In addition, the first right image 1014 is combined with the foreground 1022 and thus the second right image 1037 is created.

The final images 1025 and 1027, created as all the objects (e.g., objects 1, 2, and 3) are separated into left and right images without setting up a reference plane and they are rendered according, may display all the objects at different locations from each other. By contrast, both the final images 1035 and 1037 according to an embodiment of the present invention display a foreground object (object 3) forming a common image at the same location in each of the left-right images, while objects 1 and 2 are at different respective locations in the left-right images. Therefore, the interval between the foreground object (object 3) and object 1 and the interval between the foreground object (object 3) and object 2 cause an error as if they are mismatched, without the binocular disparity. In order to resolve the problems, a particular offset value needs to be applied to the common image combining process, which will be described later referring to the accompanying drawings.

Figure 10E:
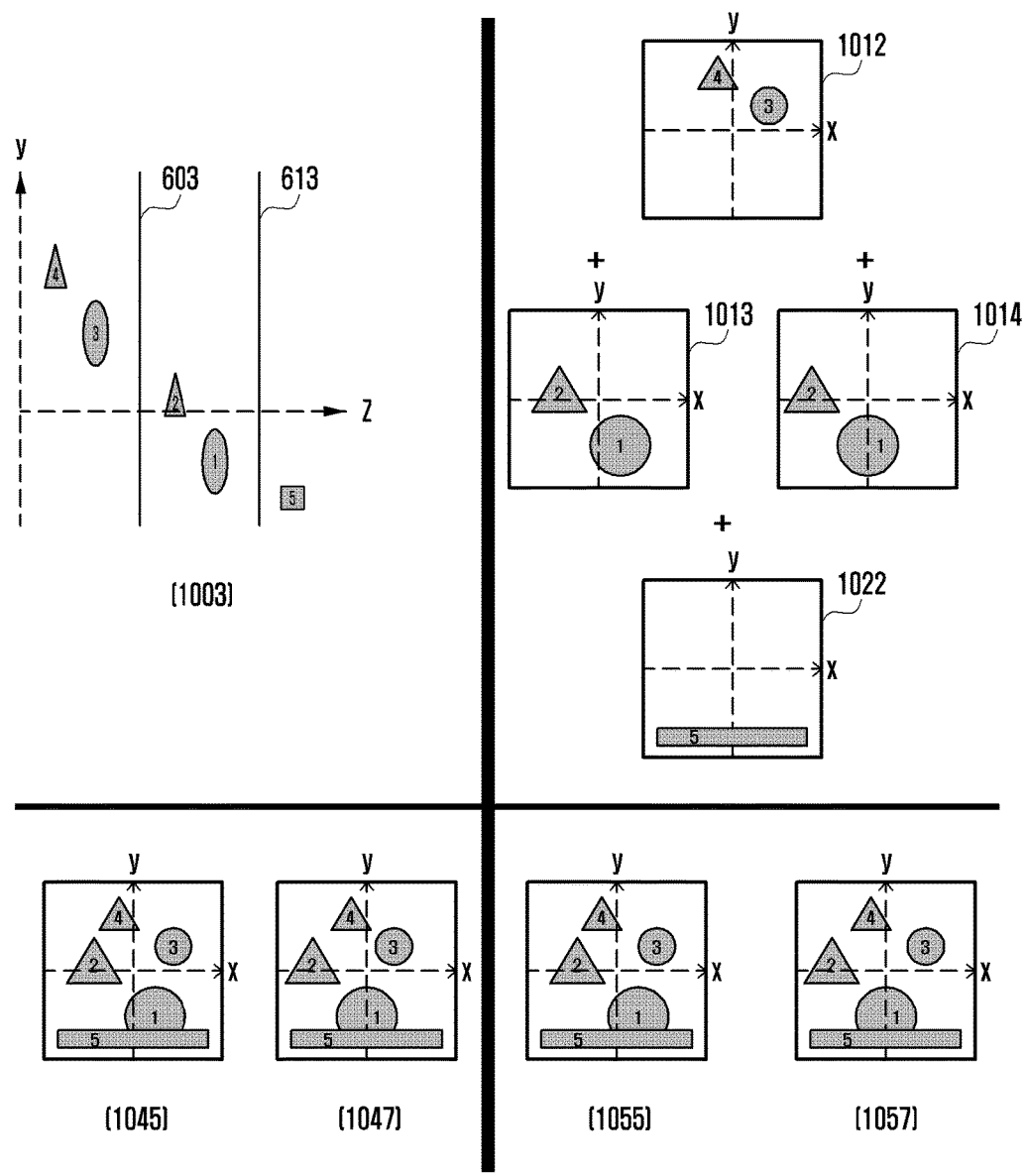

FIG. 10E is a series of diagrams illustrating a result of the combination of two types of common images (a foreground image and a background image) with the first left image and the first right image. The relative Z-axis coordinates of the objects shown in FIG. 10E are shown in diagram 1003. Diagrams 1045 and 1047 show the final images that are obtained as all the objects are separated into left and right images by setting up a reference plane, and rendered according to a first method. Since objects 1 to 5 shown in diagrams 1045 and 1047 are rendered to correspond to locations at which the right and left eyes see them, the locations may differ from each other.

In addition, FIG. 10E illustrates a process where a background image 1012, a first left image 1013 and a foreground image 1022 are combined to create a second left image 1055. In addition, a background image 1012, a first right image 1014 and a foreground image 1022 are combined to create a second right image 1057. In the final images 1055 and 1057 rendered according to an embodiment of the present invention, objects 1 and 2 combined from the left and right images may be shown at different locations. However, objects 3 and 4, combined from the background image 1012, or a common image, may be displayed at the same location in the images shown in diagrams 1055 and 1057. Similarly, object 5, combined from the foreground image 1022, or a common image, may be displayed at the same location in the images shown in diagrams 1055 and 1057. Therefore, in the combined, final image, an error may occur as if the locations between objects are mismatched.

Figure 11B:
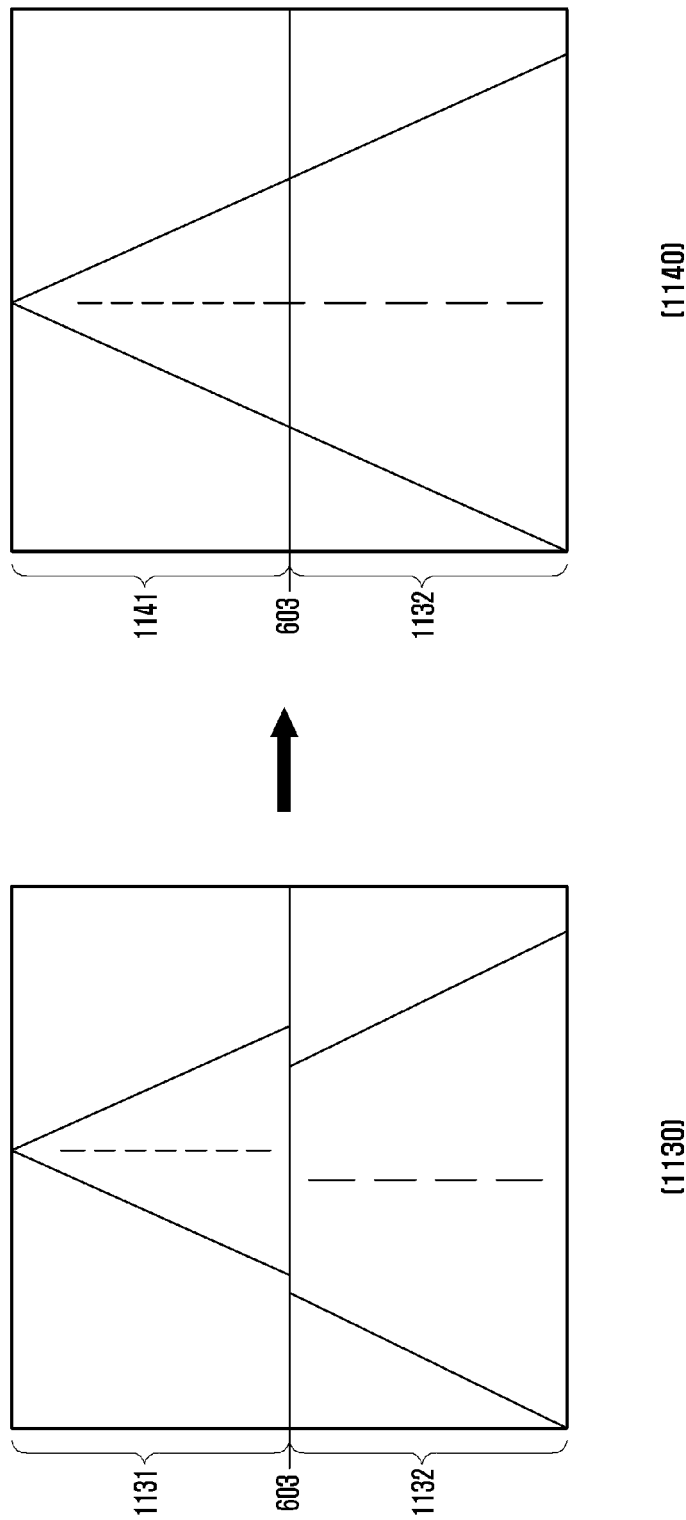

This error may appear as a mismatch between images mismatch as shown in FIGS. 11A and 11B. FIGS. 11A and 11B are diagrams illustrating an offset value applying process according to an embodiment of the present invention. Diagram 1110 of FIG. 11A shows the second left image of a 3D road image. The second left image shown in diagram 1110 is created as a combination of the first left image 1112 with a common image (a background image) 1111. The object in the first left image 1112 may be shifted to the right relative to the object in the common image (background image) 1111. The smaller the angle 606 of FIG. 6 that creates the first reference plane 603, the larger the extent of shift between the object in front of the first reference plane 603 and the object behind the first reference plane 603. That is, the closer the location of the first reference plane 603 is to the user's viewpoint, the larger the extent of disparity (shift). The disparity between the common image (background image) and the first left image is removed by setting an offset value to the common image (background image), as shown in diagram 1120. The offset value set to the common image 1121 is a value corresponding to the distance between the center line (line 607 shown in FIG. 6) and the left eye (which is not a user's eye but a viewpoint used to create the first left image). The common image (background image) 1121 is shifted and displayed in the right by the offset value.

Diagram 1130 of FIG. 11B shows a second right image in which a disparity has occurred. Diagram 1130 shows the second right image of a 3D road image.

The second right image shown in diagram 1130 is created as a combination of the first right image 1132 with a common image (a background image) 1131. The object in the first right image 1132 is shifted to the left relative to the object in the common image 1131. The disparity (shift) between the common image (background image) and the first right image is removed by setting an offset value to the common image (background image) 1131. Therefore, the disparity problems may be resolved, and the result is shown in diagram 1140. The offset value set to the common image 1131 corresponds to the distance between the center line (line 607 shown in FIG. 6) and the right eye (which is a viewpoint used to create the first right image). The common image 1131 of the second right image may be shifted in the left by the offset value, and displayed as shown in the image 1141. The offset value applying method may be applied to the foreground image in the same way as the offset value applying method is applied to the background image.

Figure 12:
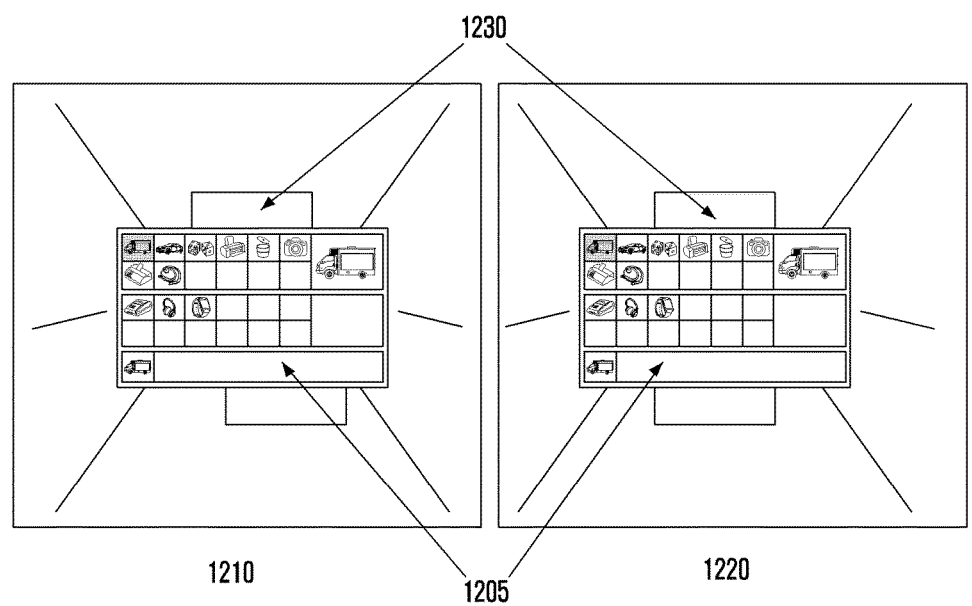
FIG. 12 is a diagram illustrating screens showing the final image combined with a foreground image according to an embodiment of the present invention.

FIG. 12 illustrates screens showing the final image combined with a foreground image according to an embodiment of the present invention.

Referring to FIG. 12, diagram 1210 shows a second left image created as a foreground image 1205 (e.g., 2D menu screen) and a background 1230 are combined with a first left image. For example, the combined image is created as the foreground 1205 and the background image 1230 are sequentially combined with the first left image. Diagram 1220 shows a second right image created as a foreground image 1205, a background 1230 and a first right image are combined with each other. When comparing the second left image 1210 with the second right image 1220, the background image 1230 and the foreground image 1205 (i.e., the common images) are shown at the same location in the second left image 1210 and the second right image 1220, and other images that are not common images are displayed at different locations from each other. Since the foreground image as a common image is combined with the image, a disparity (shift) may occur between the foreground image 1205 and the first left image or the first right image. Therefore, when an offset value is applied to the foreground image 1205, a disparity (shift) may be removed from the final image. As shown in FIG. 12, the foreground image 1205 and the background image 1230 are combined with the left and right images respectively, the offset values for the respective images may differ from each other. Therefore, the offset value applying process may be performed for the foreground image and the background image, respectively.

FIG. 13 includes diagrams illustrating a method of implementing 3D on a menu screen according to various embodiments of the present invention.

Referring to FIG. 13, diagram 1310 shows a menu screen set to have 3D coordinates in electronic devices. The menu screen of diagram 1310 shows application executing icons spirally aligned. As shown in diagram 1310, object 1311 is set to be relatively close to the user's viewpoint, and object 1312 is set to be far away relative to object 1311. As such, the content items have coordinates corresponding to up and down and right and left locations and are set to be close to or far from the user's viewpoint. These content items can be processed by a rendering method according to an embodiment of the present invention. According to an embodiment of the present invention, for example, object 1311 shown in diagram 1310 may be classified as an object in the left and right image area and object 1312 may be classified as an object in the background image area. It should be understood that the present invention may also applied to menus that are designed to be variously displayed with 3D coordinates. The present invention may applied to the menu screen shown in diagram 1310 and also to objects set with 3D coordinates in a particular application (an image display application) as shown in diagram 1320. For example, object 1321 may be in the left-right image area and object 1322 may be in the background image area. In this case, the object 1321 may be separated into a first left image and a first right image, and the object 1322 may be created as a common image.

As described above, a method of rendering content according to various embodiments of the present invention may include determining at least one reference plane set to three dimensional (3D) content, in response to a request for displaying 3D content; classifying objects based on their location relative to a location of the reference plane; creating a first left image, a first right image and at least one common image, corresponding to the classified object; and combining at least one common image with each of the first left image and the first right image, respectively.

The classification of objects may include classifying an entire area showing the objects into a background image area, separate left and right area and a foreground area, based on the location of the reference plane. The creation of a first left image, a first right image and at least one common image may include creating the first left image and the first right image from the objects in the separate left and right area; and creating the common images from the objects in the background image area and the foreground image area, respectively.

The reference plane may include a point at which a center line extending from the center of the viewpoints of both sides used for the rendering and a sightline of a viewpoint one side viewing the center line at a particular angle are crossed. The particular angle may be set to a preset, fixed value or a value set by a user.

When a single object exists across both areas of the reference plane, the object may be processed as a single object; or separated into two objects to process the separated objects. When the object is processed as a single object, the object may be created as a first left image and a first right image or as common images.

When a disparity (shift) occurs between the combined images, combining a common image with a first left image or a first right image may include applying offset values to the images and removing the disparity. The offset value may be set to a value corresponding to the distance between the center of the viewpoints of both sides used for the rendering and the viewpoint of one side. The removal of the disparity may be include shifting the common image combined with the first left image to the right by an offset value and shifting the common image combined with the first right image to the left by an offset value.

In addition, a method according to an embodiment of the present invention may include displaying a second left image, created as the first left image is combined with at least one common image, and a second right image, created as the first right image is combined with at least one common image.

Figure 14:
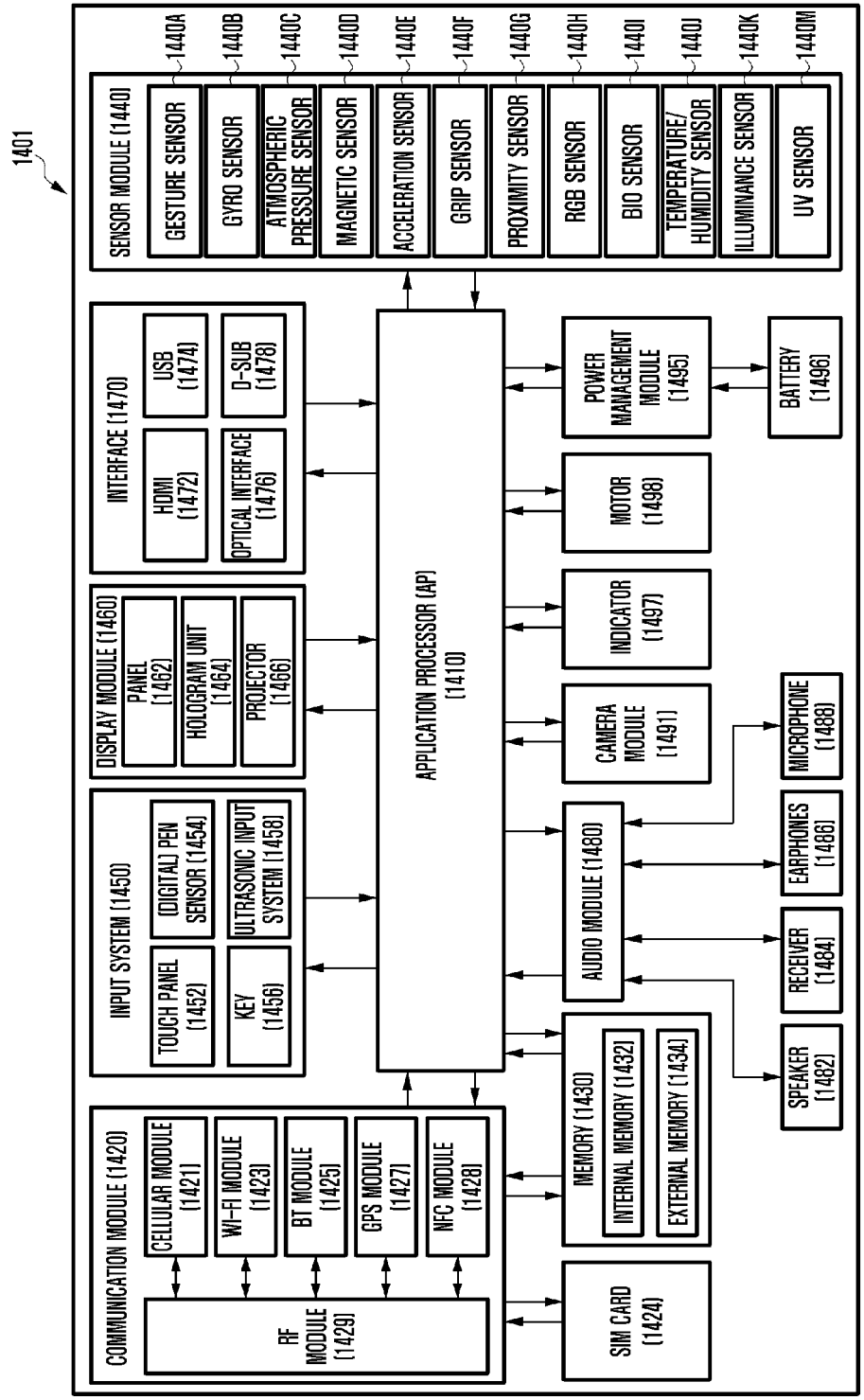
FIG. 14 is a schematic block diagram illustrating an electronic device according to an embodiment of the present invention.

FIG. 14 is a block diagram illustrating an electronic device 1401 according to an embodiment of the present invention. The electronic device 1401 may form, for example, all or a part of the electronic device 101 shown in FIG. 1. Referring to FIG. 14, the electronic device 1401 includes at least one application processor (AP) 1410, a communication module 1420, a subscriber identification module (SIM) card 1424, a memory 1430, a sensor module 1440, an input system 1450, a display module 1460, an interface 1470, an audio module 1480, a camera module 1491, a power management module 1495, a battery 1496, an indicator 1497, and a motor 1498.

The AP 1410 drives an operating system or applications, controls a plurality of hardware or software components connected thereto, and also performs processing and operation for various data including multimedia data. The AP 1410 may be formed as a system-on-chip (SoC), for example. According to an embodiment of the present invention, the AP 1410 may further include a graphic processing unit (GPU).

The communication module 1420 (e.g., the communication interface 160) performs a data communication with any other electronic device (e.g., the external electronic device 104 or HMT frame 106) connected to the electronic device 1401 (e.g., the electronic device 101) through the network. According to an embodiment of the present invention, the communication module 1420 includes therein a cellular module 1421, a wireless fidelity (WiFi) module 1423, a bluetooth (BT) module 1425, a global positioning system (GPS) module 1427, a near-field communications (NFC) module 1428, and a radio frequency (RF) module 1429.

The cellular module 1421 provides voice calls, video calls, a message service, an internet service, etc., through a communication network (e.g., long-term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM), etc.). Additionally, the cellular module 1421 performs identification and authentication of the electronic device in the communication network, using the SIM card 1424. According to an embodiment of the present invention, the cellular module 1421 performs at least part of functions the AP 1410 can provide. For example, the cellular module 1421 may perform at least part of a multimedia control function.

According to an embodiment of the present invention, the cellular module 1421 may include a communication processor (CP). Additionally, the cellular module 1421 may be formed of SoC, for example. Although some elements such as the cellular module 1421 (e.g., the CP), the memory 1430, or the power management module 1495 are shown as separate elements being different from the AP 1410 in FIG. 14, the AP 1410 may be formed to have at least part (e.g., the cellular module 1421) of the above elements.

According to an embodiment of the present invention, the AP 1410 or the cellular module 1421 (e.g., the CP) may load commands or data, received from a nonvolatile memory connected thereto or from at least one of the other elements, into a volatile memory to process them. Additionally, the AP 1410 or the cellular module 1421 may store data, received from or created at one or more of the other elements, in the nonvolatile memory.

Each of the WiFi module 1423, the BT module 1425, the GPS module 1427 and the NFC module 1428 may include a processor for processing data transmitted or received therethrough. Although FIG. 14 shows the cellular module 1421, the WiFi module 1423, the BT module 1425, the GPS module 1427 and the NFC module 1428 as different blocks, some of these modules may be contained in a single integrated circuit (IC) chip or a single IC package according to an embodiment of the present invention. For example, at least part (e.g., the CP corresponding to the cellular module 1421 and a WiFi processor corresponding to the WiFi module 1423) of respective processors corresponding to the cellular module 1421, the WiFi module 1423, the BT module 1425, the GPS module 1427 and the NFC module 1428 may be formed as a single SoC.

The RF module 1429 transmits and receives data, e.g., RF signals or any other electric signals. Although not shown, the RF module 1429 may include a transceiver, a power amp module (PAM), a frequency filter, a low noise amplifier (LNA), or the like. Also, the RF module 1429 may include any component, e.g., a wire or a conductor, for transmission of electromagnetic waves in a free air space. Although FIG. 14 shows that the cellular module 1421, the WiFi module 1423, the BT module 1425, the GPS module 1427 and the NFC module 1428 share the RF module 1429, at least one of these modules may perform transmission and reception of RF signals through a separate RF module according to an embodiment of the present invention.

The SIM card 1424 may be inserted into a slot 1425 formed at a certain place of the electronic device. The SIM card 1424 may contain therein an integrated circuit card identifier (ICCID) or an international mobile subscriber identity (IMSI).

The memory 1430 (e.g., the memory 130) may include an internal memory 1432 and an external memory 1434. The internal memory 1432 may include, for example, at least one of a volatile memory (e.g., dynamic random access memory (RAM) (DRAM)), static RAM (SRAM), synchronous DRAM (SDRAM), etc.) or a nonvolatile memory (e.g., one time programmable read-only memory (ROM) (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment of the present invention, the internal memory 1432 may have the form of a solid state drive (SSD). The external memory 1434 may include a flash drive, e.g., compact flash (CF), secure digital (SD), micro secure digital (SD)), mini secure digital (Mini-SD), extreme digital (xD), memory stick, or the like. The external memory 1434 may be functionally connected to the electronic device 1401 through various interfaces. According to an embodiment of the present invention, the electronic device 1401 may further include a storage device or medium such as a hard drive.

The sensor module 1440 measures physical quantity or sense an operating status of the electronic device 1401, and then converts measured or sensed information into electric signals. The sensor module 1440 includes, for example, at least one of a gesture sensor 1440A, a gyro sensor 1440B, an atmospheric sensor 1440C, a magnetic sensor 1440D, an acceleration sensor 1440E, a grip sensor 1440F, a proximity sensor 1440G, a color sensor 1440H (e.g., red, green, blue (RGB) sensor), a biometric sensor 1440I, a temperature-humidity sensor 1440J, an illumination sensor 1440K, and a UV (ultraviolet) sensor 1440M. Additionally or alternatively, the sensor module 1440 may include, e.g., an E-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 1440 may include a control circuit for controlling one or more sensors equipped therein.

The input system 1450 includes a touch panel 1452, a digital pen sensor 1454, a key 1456, and an ultrasonic input unit 1458. The touch panel 1452 recognizes a touch input in a manner of capacitive type, resistive type, infrared type, or ultrasonic type. Also, the touch panel 1452 may further include a control circuit. When the electronic device 1401 includes a capacitive type display, a physical contact or proximity may be recognized. The touch panel 1452 may further include a tactile layer. In this case, the touch panel 1452 may offer tactile feedback to a user.

The digital pen sensor 1454 may be formed in the same or similar manner as receiving a touch input or by using a separate recognition sheet. The key 1456 may include, for example, a physical button, an optical key, or a keypad. The ultrasonic input unit 1458 is a specific device capable of identifying data by sensing sound waves with a microphone 1488 in the electronic device 1401 through an input tool that generates ultrasonic signals, thus allowing wireless recognition. According to an embodiment of the present invention, the electronic device 1401 receives a user input from any external device (e.g., a computer or a HMT frame) connected thereto through the communication module 1420.

The display module 1460 (e.g., the display 150) includes, for example, a panel 1462, a hologram 1464, or a projector 1466. The panel 1462 may be, for example, a liquid crystal display (LCD), an active matrix organic light emitting diode (AM-OLED), or the like. The panel 1462 may have a flexible, transparent or wearable form. The panel 1462 may be formed of a single module with the touch panel 1452. The hologram 1464 shows a stereoscopic image in the air using interference of light. The projector 1466 projects an image onto a screen, which may be located at the inside or outside of the electronic device 1401. According to an embodiment of the present invention, the display module 1460 may further include a control circuit for controlling the panel 1462, the hologram 1464, and the projector 1466.

The interface 1470 includes, for example, a high-definition multimedia interface (HDMI) 1472, a universal serial bus (USB) 1474, an optical interface 1476, or a d-subminiature (D-sub) 1478. The interface 1470 may be contained, for example, in the communication interface 160 shown in FIG. 1. Additionally or alternatively, the interface 1470 may include, for example, a mobile high-definition link (MHL)) interface, a secure digital (SD) card/multi-media card (MMC) interface, or an infrared data association (IrDA) interface.

The audio module 1480 performs a conversion between sounds and electric signals. At least part of the audio module 1480 may be contained, for example, in the input/output interface 140 shown in FIG. 1. The audio module 1480 processes sound information input or output through a speaker 1482, a receiver 1484, an earphone 1486, or a microphone 1488.

The camera module 1491 is a device capable of obtaining still images and moving images. According to an embodiment of the present invention, the camera module 1491 may include at least one image sensor (e.g., a front sensor or a rear sensor), a lens (not shown), an Image Signal Processor, not shown (ISP), or a flash (e.g., LED or xenon lamp, not shown).

The power management module 1495 manages electric power of the electronic device 1401. Although not shown, the power management module 1495 may include, for example, a power management integrated circuit (PMIC), a charger IC, or a battery gauge.

The PMIC may be formed, for example, of an IC chip or SoC. Charging may be performed in a wired or wireless manner. The charger IC may charge a battery 1496 and prevent overvoltage or overcurrent from a charger. According to an embodiment of the present invention, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 1496 and a voltage, current or temperature in a charging process. The battery 1496 may store or create electric power therein and supply electric power to the electronic device 1401. The battery 1496 may be, for example, a rechargeable battery or a solar battery.

The indicator 1497 shows thereon a current status (e.g., a booting status, a message status, or a recharging status) of the electronic device 1401 or of its part (e.g., the AP 1410). The motor 1498 converts an electric signal into a mechanical vibration. Although not shown, the electronic device 1401 may include a specific processor (e.g., a graphical processing unit (GPU)) for supporting a mobile television (TV). This processor may process media data that comply with digital multimedia broadcasting (DMB), digital video broadcasting (DVB), or media flow.

The programming module according to an embodiment of the present invention may include one or more of the above-described elements. Alternatively, some of the above-described elements may be omitted from the programming module. Alternatively, the programming module may further include additional elements. The operations performed by the programming module or other elements according to an embodiment of the present invention may be processed in a sequential method, a parallel method, a repetitive method, or a heuristic method. Also, some of the operations may be omitted, or other operations may be added to the operations.

Since the method and apparatus for rendering 3D content according to an embodiment of the present invention produce objects in a particular area in the field of vision as only one scene when performing a rendering operation to display 3D screen images, wasting of rendering resources can be reduced. In addition, the embodiment of the present invention can increase the rendering speed when outputting 3D screen images.

The embodiments of the present invention described in the description and drawings are merely provided to assist in a comprehensive understanding of the invention and do not limit the invention. Although embodiments of the invention have been described in detail above, it should be understood that many variations and modifications of the basic inventive concept herein described, which may be apparent to those skilled in the art, will still fall within the spirit and scope of the embodiments of the invention as defined by the appended claims and their equivalents.

What is claimed is:

1. A method of rendering content comprising:
   determining at least one reference plane set to three dimensional (3D) content, in response to a request for displaying 3D content;
   classifying objects, displayed on the 3D content, based on a location of each object relative to a location of the reference plane into objects corresponding to at least one of a first left image or a first right image, and objects corresponding to at least one common image, respectively;
   creating the first left image, the first right image and the at least one common image, according to the respective classified objects; and
   combining the at least one common image with each of the first left image and the first right image to form a second left image and a second right image, respectively,
   wherein the at least one reference plane comprises at least one of a first reference plane or a second reference plane, the second reference plane being relatively farther from a user's viewpoint than the first reference plane, and
   wherein the objects corresponding to at least one common image comprise at least one of:
   at least one object located closer to the user's viewpoint than the first reference plane; or
   at least one object located farther away from the user's viewpoint than the second reference plane.

2. The method of claim 1, wherein classifying the objects comprises classifying an entire area showing the objects into a background image area, separate left and right area, and a foreground area, based on the location of each object relative to the location of the reference plane, and
   wherein creating the first left image, the first right image and the at least one common image comprises:
   creating the first left image and the first right image from the objects in the separate left and right area; and
   creating the at least one common image from the objects in the background image area and the foreground image area, respectively.

3. The method of claim 1, wherein the reference plane passes through a point at which a center line extending from a center of left and right viewpoints used for rendering and a sightline extending from one of the viewpoints towards the centerline at a particular angle are crossed.

4. The method of claim 3, wherein the particular angle comprises:
   a preset fixed value or a value set by a user.

5. The method of claim 1, wherein creating the first left image, the first right image and the at least one common image comprises processing, when one object extends across both sides of the reference plane, the object as a single object, or separating the object into two objects to separately process the separated objects.

6. The method of claim 5, wherein processing the object as a single object comprises:
   creating a first left image and a first right image from the object; or creating common images from the object.

7. The method of claim 1, wherein combining the at least one common image comprises:
   applying, when a disparity occurs between the second left image and the second right image, offset values to the combined common images respectively to remove the disparity.

8. The method of claim 7, wherein the offset value is set to a value corresponding to a distance between the center of the viewpoints of both sides used for the rendering and the viewpoint of one of the left and right viewpoints.

9. The method of claim 7, wherein removing the disparity comprises:
   shifting the second left image to the right by an offset value; and
   shifting the second right image to the left by an offset value.

10. The method of claim 1, further comprising:
    displaying the second left image and the second right image.

11. An electronic device for rendering content comprising:
    a memory configured to store 3D content and operation programs;
    a processor configured to:
    determine at least one reference plane set to three dimensional (3D) content, in response to receiving a request for displaying 3D content;
    classify objects, displayed on the 3D content, based on a location of each object relative to a location of the reference plane into objects corresponding to at least one of a first left image or a first right image, and objects corresponding to at least one common image, respectively;
    create the first left image, the first right image and the at least one common image, according to the respective classified objects; and
    combine at least one common image with each of the first left image and the first right image to form a second left image and a second right image, respectively; and
    a display for displaying the second left image and the second right image,
    wherein the at least one reference plane comprises at least one of a first reference plane or a second reference plane, the second reference plane being relatively farther from a user's viewpoint than the first reference plane, and
    wherein the objects corresponding to at least one common image comprise at least one of:
    at least one object located closer than the first reference plane from the user's viewpoint; or
    at least one object located farther than the second reference plane from the user's viewpoint.

12. The electronic device of claim 11, wherein the processor is further configured to:
    classify an entire area showing the objects into a background image area, separate left and right area and a foreground area, based on the location of each object relative to the location of the reference plane;
    create the first left image and the first right image from the objects in the separate left and right area; and create the at least one common image from the objects in the background image area and the foreground image area, respectively.

13. The electronic device of claim 11, wherein the reference plane passes through a point at which a center line extending from a center of left and right viewpoints used for rendering and a sightline extending from one of the viewpoints towards the centerline at a particular angle are crossed.

14. The electronic device of claim 13, wherein the processor sets the particular angle to a preset fixed value or a value set by a user.

15. The electronic device of claim 11, wherein, when one object extends across both sides of the reference plane, the processor is further configured to process the object as a single object or separate the object into two objects to separately process the separated objects.

16. The electronic device of claim 15, wherein the processor is further configured to process the object as a single object to create a first left image and a first right image from the object or to create common images from the object.

17. The electronic device of claim 11, wherein, when a disparity occurs between the second left image and the second right image, the processor is further configured to apply offset values to the combined common images respectively to remove the disparity.

18. The electronic device of claim 17, wherein the processor is further configured to set the offset value to a value corresponding to a distance between the center of the viewpoints of both sides used for the rendering and the viewpoint of the left and right viewpoints.

19. The electronic device of claim 17, wherein the processor shifts the second left image to the right by an offset value and the second right image to the left by an offset value.

20. The electronic device of claim 11, wherein, when the processor determines two reference planes, the processor is further configured to classify objects according to whether the objects are located between the two reference planes.

* * * * *